(12) United States Patent
Fuwa et al.

(10) Patent No.: US 7,066,146 B2
(45) Date of Patent: Jun. 27, 2006

(54) CONTROLLER OF INTERNAL COMBUSTION ENGINE

(75) Inventors: Naohide Fuwa, Susono (JP); Masanobu Kanamaru, Mishima (JP); Masaaki Konishi, Susono (JP); Akinori Osanai, Susono (JP); Satoru Watanabe, Susono (JP); Masato Ehara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/131,404

(22) Filed: May 18, 2005

(65) Prior Publication Data

US 2005/0205062 A1    Sep. 22, 2005

Related U.S. Application Data

(62) Division of application No. 10/450,152, filed as application No. PCT/JP01/10917 on Dec. 12, 2001.

(30) Foreign Application Priority Data

Dec. 12, 2000   (JP) .............................. 2000-377960

(51) Int. Cl.
   *F02P 5/00*   (2006.01)
(52) U.S. Cl. .............................. 123/406.55; 123/568.14
(58) Field of Classification Search .......... 123/406.55, 123/90.15, 90.19, 568.14
   See application file for complete search history.

(56) References Cited

U.S. PATENT DOCUMENTS

| | | | |
|---|---|---|---|
| 4,702,211 A * | 10/1987 | Kato et al. ............. | 123/406.55 |
| 4,896,642 A * | 1/1990 | Washino et al. ....... | 123/406.42 |
| 4,996,960 A | 3/1991 | Nishiyama et al. | |
| 5,219,227 A * | 6/1993 | Yang et al. .................. | 374/143 |
| 5,422,811 A * | 6/1995 | Togai ......................... | 701/105 |
| 5,590,632 A | 1/1997 | Kato et al. | |
| 5,718,203 A | 2/1998 | Shimada et al. | |
| 6,092,496 A * | 7/2000 | Bhargava et al. ......... | 123/90.15 |
| 6,125,801 A * | 10/2000 | Mendler ................... | 123/48 R |
| 6,330,510 B1 | 12/2001 | Takaku et al. | |
| 6,530,361 B1* | 3/2003 | Shiraishi et al. ............. | 123/435 |
| 6,536,407 B1* | 3/2003 | Denbratt ..................... | 123/311 |
| 6,738,707 B1* | 5/2004 | Kotwicki et al. ........... | 701/108 |
| 6,840,235 B1* | 1/2005 | Koseki et al. ......... | 123/568.14 |
| 2001/0056322 A1* | 12/2001 | Yoshizawa et al. ......... | 701/104 |
| 2003/0093212 A1* | 5/2003 | Kotwicki et al. ........... | 701/102 |

(Continued)

FOREIGN PATENT DOCUMENTS

JP    A 2-291447    12/1990

(Continued)

*Primary Examiner*—Mahmoud Gimie
(74) *Attorney, Agent, or Firm*—Oliff & Berridge, PLC

(57) ABSTRACT

A device for controlling an internal combustion engine, comprising a variable valve mechanism for varying opening areas (valve lift) or the working angles (valve-opening periods) of at least either the intake valves or the exhaust valves, wherein a pressure in the cylinder is calculated based on the opening area or the working angle of at least either the intake valve or the exhaust valve varied by the variable valve mechanism, and the internal combustion engine is controlled based on the pressure in the cylinder. Upon calculating the pressure in the cylinder based on the opening areas or the working angles of the intake and exhaust valves, it is possible to more suitably control the internal combustion engine based not only upon the peak combustion pressure in the cylinder like when a combustion pressure sensor is used but also upon a pressure in the cylinder at a moment other than the peak combustion pressure.

9 Claims, 36 Drawing Sheets

U.S. PATENT DOCUMENTS

2003/0106368 A1 * 6/2003 Osaki et al. ............... 73/118.2

FOREIGN PATENT DOCUMENTS

| JP | A 04-081574 | 3/1992 |
| --- | --- | --- |
| JP | A-4-179844 | 6/1992 |
| JP | A-4-191426 | 7/1992 |
| JP | A 6-58235 | 3/1994 |
| JP | A 7-49034 | 2/1995 |
| JP | A 7-301144 | 11/1995 |
| JP | A 9-53503 | 2/1997 |
| JP | A 9-209895 | 8/1997 |
| JP | A 10-288067 | 10/1998 |
| JP | A 11-294219 | 10/1999 |
| JP | A 11-336599 | 12/1999 |
| JP | A 2000-73800 | 3/2000 |
| JP | A 2000-97061 | 4/2000 |
| JP | A-2000-265873 | 9/2000 |
| JP | A 2000-314318 | 11/2000 |

* cited by examiner

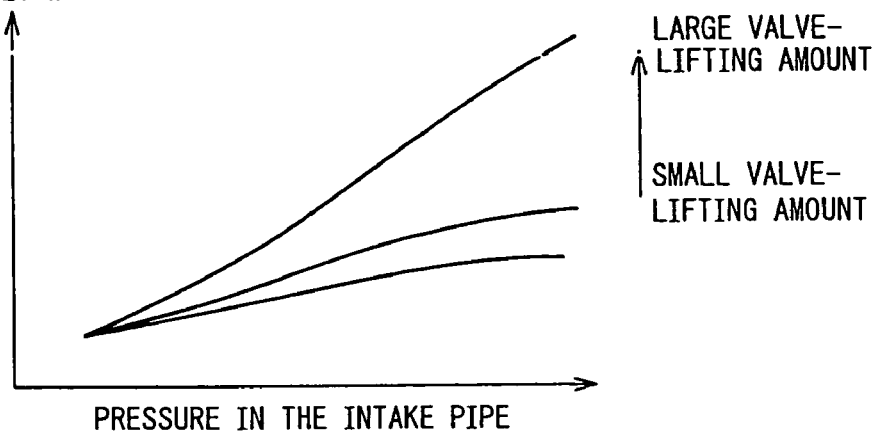

NORMAL CONDITION OF TEMP.
OF GAS IN THE CYLINDER
AT THE COMPRESSION TDC

PRESSURE IN THE INTAKE PIPE

NORMAL CONDITION OF TEMP.
OF GAS IN THE CYLINDER
AT THE COMPRESSION TDC

ENGINE ROTATIONAL SPEED

CONTROLLER OF INTERNAL COMBUSTION ENGINE

This is a Division of application Ser. No. 10/450,152 filed Jun. 11, 2003, which in turn is a National Stage of PCT/JP01/10917 filed Dec. 12, 2001. The entire disclosure of the prior applications is hereby incorporated by reference herein in its entirety.

TECHNICAL FIELD

The present invention relates to a device for controlling internal combustion engines.

BACKGROUND ART

There have heretofore been known devices for controlling internal combustion engines based upon the pressure in the cylinders. Japanese Unexamined Patent Publication (Kokai) No. 9-53503 discloses a device of this kind for controlling internal combustion engines. In the device for controlling internal combustion engines disclosed in the above Japanese Unexamined Patent Publication (Kokai) No. 9-53503, the amount of fuel injection and the ignition timing are calculated based on an output value of a cylinder pressure sensor that detects the pressure in the cylinder.

When the pressure in the cylinder is detected by the cylinder pressure sensor as in the device for controlling internal combustion engines disclosed in Japanese Unexamined Patent Publication (Kokai) No. 9-53503, however, the pressure in the cylinder that is detected is a peak combustion pressure at a moment of a crank angle of 10 to 15 degrees after the top dead center in the compression stroke. With the device for controlling internal combustion engines disclosed in Japanese Unexamined Patent Publication (Kokai) No. 9-53503, therefore, it is not possible to control the internal combustion engines based on the pressure in the cylinder other than the peak combustion pressure in the cylinder, such as the pressure at the top dead center in the compression stroke. In addition, with the device for controlling internal combustion engines, which does not consider a change in the pressure in the cylinder accompanying a change in the opening areas of the intake and exhaust valves or a change in the working angle as a result of employing a variable valve mechanism as taught in Japanese Unexamined Patent Publication (Kokai) No. 9-53503, it is not possible to suitably control the internal combustion engine when the opening areas of the intake and exhaust valves vary or when the working angles thereof vary.

There has further been known a device for controlling internal combustion engines based on the temperature of a certain portion in the cylinder. The device for controlling internal combustion engines of this type has been disclosed in, for example, Japanese Unexamined Patent Publication (Kokai) No. 4-81574. In the device for controlling internal combustion engines taught in Japanese Unexamined Patent Publication (Kokai) No. 4-81574, the ignition timing is calculated based upon an output value of a wall temperature sensor that detects the temperature of the cylinder wall, and the internal combustion engine is controlled based on the thus calculated ignition timing.

In the device for controlling internal combustion engines taught in the above Japanese Unexamined Patent Publication (Kokai) No. 4-81574, the ignition timing is calculated based on the temperature of the cylinder wall, and the internal combustion engine is controlled based on the ignition timing. However, there is a considerable difference between the temperature of the cylinder wall and the temperature of gas in the cylinder. In addition, it can be said that a suitable ignition timing is determined based on the temperature of gas in the cylinder rather than the temperature of the cylinder wall. Therefore, the internal combustion engine cannot be suitably controlled by the device for controlling internal combustion engines, which calculates the ignition timing based on the temperature of the cylinder wall as taught in Japanese Unexamined Patent Publication (Kokai) No. 4-81574. Moreover, with the device for controlling internal combustion engines, which does not consider a change in the temperature of gas in the cylinder accompanying a change in the opening areas of the intake and exhaust valves or a change in the working angles thereof as a result of employing a variable valve mechanism taught in Japanese Unexamined Patent Publication (Kokai) No. 4-81574, it is not possible to suitably control the internal combustion engine when the opening areas of the intake and exhaust valves vary or when the working angles thereof vary.

There has further been known a device for controlling internal combustion engines based upon the ratio or amount of an internal EGR gas by being provided with a variable valve mechanism for at least the intake valves or the exhaust valves. As a device for controlling internal combustion engines of this kind, there has been known the one disclosed in, for example, Japanese Unexamined Patent Publication (Kokai) No. 9-209895. The device for controlling internal combustion engines disclosed in Japanese Unexamined Patent Publication (Kokai) No. 9-209895 is equipped with a variable valve mechanism for shifting the opening/closing timing (valve timing) without varying the length of period for opening the intake valve, and calculates the ignition timing based on the sum of the amount of the internal EGR gas (recirculating amount of the internal exhaust gas) or the amount of the burnt gas taken into the cylinder again after blown back into the intake pipe and the amount of the burnt gas remaining in the cylinder, i.e. not exhausted from the cylinder, thereby to control the internal combustion engine based on the thus calculated ignition timing.

However, the device for controlling internal combustion engines disclosed in Japanese Unexamined Patent Publication (Kokai) No. 9-209895 is not considering the amount of varying the opening areas of the intake and exhaust valves, though it is considering the amount of shifting the opening/closing timing of the intake and exhaust valves at the time of calculating the amount of the internal EGR gas. When the variable valve mechanism is provided with a function for varying the valve-lifting amount and when the opening areas of the intake and exhaust valves are varied by changing the valve-lifting amount, the real amount of the internal EGR gas varies to a considerable degree even though the opening/closing timings of the intake and exhaust valves are not shifted. When the amount of the internal EGR gas is calculated by the device for controlling internal combustion engines disclosed in Japanese Unexamined Patent Publication (Kokai) No. 9-209895 without considering a change in the opening areas of the intake and exhaust valves despite the opening areas of the intake and exhaust valves are changing, therefore, the calculated amount of the internal EGR gas becomes considerably different from the real amount of the internal EGR gas. Namely, when the opening areas of the intake and exhaust valves are subject to change, the amount of the internal EGR gas is not correctly calculated by the device for controlling internal combustion engines taught in Japanese Unexamined Patent Publication (Kokai) No. 9-209895, which considers a change in the amount of the internal EGR gas accompanying a change in the opening areas of the intake and exhaust valves due, for example, to the variable valve mechanism. Accordingly, it is not possible to suitably control the internal combustion engines.

Further, the device for controlling the internal combustion engines disclosed in Japanese Unexamined Patent Publication (Kokai) No. 9-209895 considers the amount of shifting the opening/closing timings of the intake and exhaust valves at the time of calculating the amount of the internal EGR gas but does not consider the amount of changing the rotational angle of the cam shafts that correspond to the periods of opening the intake and exhaust valves. On the other hand, when the variable valve mechanism is provided with a function for varying the working angles of the intake and exhaust valves, i.e., with a function for increasing or decreasing the periods for opening the intake and exhaust valves and when the working angles of the intake and exhaust valves are varied, the real amount of the internal EGR gas changes to a considerable degree even when the opening/closing timings of the intake and exhaust valves are not shifted, i.e., even when the peak timing of the valve-lifting amount is not changed. When the amount of the internal EGR gas is calculated by the device for controlling internal combustion engines disclosed in Japanese Unexamined Patent Publication (Kokai) No. 9-209895 without considering a change in the working angles of the intake and exhaust valves though the working angles of the intake and exhaust valves are changing, therefore, the calculated amount of the internal EGR gas becomes considerably different from the real amount of the internal EGR gas. Namely, when the working angles of the intake and exhaust valves are subject to change, the amount of the internal EGR gas is not correctly calculated by the device for controlling internal combustion engines taught in Japanese Unexamined Patent Publication (Kokai) No. 9-209895, which does not consider a change in the amount of the internal EGR gas accompanying a change in the working angles of the intake and exhaust valves due, for example, to the variable valve mechanism. Accordingly, it is not possible to suitably control the internal combustion engines.

There has further been known a device for controlling internal combustion engines equipped with a variable valve mechanism for at least either the intake valves or the exhaust valves, based on a degree of turbulence in the cylinder that is estimated relying upon the opening area of the intake valve varied by the variable valve mechanism. A device for controlling internal combustion engines of this type has been disclosed in, for example, Japanese Unexamined Patent Publication (Kokai) No. 2000-73800. In the device for controlling internal combustion engines disclosed in Japanese Unexamined Patent Publication (Kokai) No. 2000-73800, it is estimated that the degree of turbulence in the cylinder decreases with a decrease in the opening area of the intake valve that is varied by the variable valve mechanism.

Namely, in the device for controlling internal combustion engines disclosed in Japanese Unexamined Patent Publication (Kokai) No. 2000-73800, it is estimated that the degree of turbulence in the cylinder decreases with a decrease in the opening area of the intake valve that is varied by the variable valve mechanism. In practice, however, the degree of turbulence in the cylinder increases with a decrease in the opening area of the intake valve that is varied by the variable valve mechanism. Therefore, if it is estimated that the degree of turbulence in the cylinder decreases with a decrease in the opening area of the intake valve like in the device for controlling internal combustion engines as disclosed in Japanese Unexamined Patent Publication (Kokai) No. 2000-73800 and if the internal combustion engine is controlled based on the estimated degree of turbulence in the cylinder, then, the internal combustion engine is not suitably controlled when the opening area of the intake valve is varied by the variable valve mechanism.

DISCLOSURE OF THE INVENTION

In view of the above problems, it is an object of the present invention to provide a device for controlling an internal combustion engine based not only upon a peak combustion pressure in the cylinder but also upon a pressure in the cylinder at a moment other than the peak combustion pressure, thereby to suitably control the internal combustion engine even when the opening areas or the working angles of the intake and exhaust valves are varied.

It is another object of the present invention to provide a device for more suitably controlling an internal combustion engine than when the internal combustion engine is controlled based on the temperature of the cylinder wall even when the opening areas or the working angles of the intake and exhaust valves are varied.

It is a further object of the present invention to provide a device for suitably controlling an internal combustion engine by correctly calculating an amount of the internal EGR gas even when the opening areas or the working angles of the intake and exhaust valves are varied.

It is a further object of the present invention to provide a device for suitably controlling an internal combustion engine by correctly estimating a degree of turbulence in the cylinder even when the opening areas or the working angles of the intake and exhaust valves are varied by the variable valve mechanism.

According to a first aspect of the present invention, there is provided a device for controlling an internal combustion engine based on a pressure in the cylinder, comprising a variable valve mechanism for varying opening areas of at least either the intake valves or the exhaust valves, wherein a pressure in the cylinder is calculated based on the opening area of at least either the intake valve or the exhaust valve varied by the variable valve mechanism, and the internal combustion engine is controlled based on the pressure in the cylinder.

Namely, in the device for controlling an internal combustion engine according to the first aspect of the invention, a pressure in the cylinder is calculated based on the opening area of at least either the intake valve or the exhaust valve varied by the variable valve mechanism. It is therefore possible to control the internal combustion engine based not only upon a peak combustion pressure in the cylinder but also upon a pressure in the cylinder at a moment other than the peak combustion pressure, unlike the case of detecting the pressure in the cylinder by the cylinder pressure sensor employed by the device for controlling internal combustion engines taught in Japanese Unexamined Patent Publication (Kokai) No. 9-53503. Further, since the internal combustion engine is controlled based on the pressure in the cylinder calculated relying upon the opening areas of at least either the intake valves or the exhaust valves, it is possible to suitably control the internal combustion engine even when the opening areas of the intake and exhaust valves are varied. More specifically, the pressure in the cylinder increases with an increase in the opening area of the intake valve, the pressure in the cylinder being calculated based on the opening area of the intake valve, and the internal combustion engine is so controlled that the ignition timing is delayed with an increase in the pressure in the cylinder.

Alternatively, the pressure in the cylinder increases with an increase in the opening area of the intake valve, the pressure in the cylinder being calculated based on the opening area of the intake valve, and the internal combustion engine is so controlled that the amount of fuel injection is increased with an increase in the pressure in the cylinder.

According to a second aspect of the present invention, there is provided a device for controlling an internal combustion engine based on a pressure in the cylinder, comprising a variable valve mechanism for varying working angles of at least either the intake valves or the exhaust valves, wherein a pressure in the cylinder is calculated based on the working angle of at least either the intake valve or the exhaust valve varied by the variable valve mechanism, and the internal combustion engine is controlled based on the pressure in the cylinder.

Namely, in the device for controlling an internal combustion engine according to the second aspect of the invention, a pressure in the cylinder is calculated based on the working angle of at least either the intake valve or the exhaust valve varied by the variable valve mechanism. It is therefore possible to control the internal combustion engine based not only upon a peak combustion pressure in the cylinder but also upon a pressure in the cylinder at a moment other than the peak combustion pressure, unlike the case of detecting the pressure in the cylinder by the cylinder pressure sensor employed by the device for controlling internal combustion engines taught in Japanese Unexamined Patent Publication (Kokai) No. 9-53503. Further, since the internal combustion engine is controlled based on the pressure in the cylinder calculated relying upon the working angles of at least either the intake valves or the exhaust valves, it is possible to suitably control the internal combustion engine even when the working angles of the intake and exhaust valves are varied. More specifically, when the intake valve is fully closed after the bottom dead center in the intake stroke, the pressure in the cylinder increases with a decrease in the working angle of the intake valve, the pressure in the cylinder being calculated based on the working angle of the intake valve, and the internal combustion engine is so controlled that the ignition timing is delayed with an increase in the pressure in the cylinder. Further, when the intake valve is fully closed before the bottom dead center in the intake stroke, the pressure in the cylinder increases with an increase in the working angle of the intake valve, the pressure in the cylinder being calculated based on the working angle of the intake valve, and the internal combustion engine is so controlled that the ignition timing is delayed with an increase in the pressure in the cylinder. Alternatively, the pressure in the cylinder increases with a decrease in the working angle of the intake valve, the pressure in the cylinder being calculated based on the working angle of the intake valve, and the internal combustion engine is so controlled that the amount of fuel injection is increased with an increase in the pressure in the cylinder.

According to a third aspect of the present invention, there is provided a device for controlling an internal combustion engine, comprising a variable valve mechanism for varying opening areas and working angles of at least either the intake valves or the exhaust valves, wherein a pressure in the cylinder is calculated based on the opening area and the working angle of at least either the intake valve or the exhaust valve varied by the variable valve mechanism, and the internal combustion engine is controlled based on the pressure in the cylinder.

Namely, in the device for controlling an internal combustion engine according to the third aspect of the invention, a pressure in the cylinder is calculated based on the opening area and the working angle of at least either the intake valve or the exhaust valve varied by the variable valve mechanism, and the internal combustion engine is controlled based upon the pressure in the cylinder. It is therefore possible to suitably control the internal combustion engine by more correctly calculating the pressure in the cylinder than a case of calculating the pressure in the cylinder based upon the opening areas only of the intake and exhaust valves but not upon the working angles of the intake and exhaust valves, or than a case of calculating the pressure in the cylinder based upon the working angles only of the intake and exhaust valves but not upon the opening areas of the intake and exhaust valves.

According to a fourth aspect of the present invention, there is provided a device for controlling an internal combustion engine based on a temperature of a certain portion in the cylinder, comprising a variable valve mechanism for varying opening areas of at least either the intake valves or the exhaust valves, wherein a temperature of gas in the cylinder is calculated based on the opening area of at least either the intake valve or the exhaust valve varied by the variable valve mechanism, and the internal combustion engine is controlled based on the temperature of gas in the cylinder.

In the device for controlling an internal combustion engine according to the fourth aspect of the invention, a temperature of gas in the cylinder is calculated based on the opening area of at least either the intake valve or the exhaust valve varied by the variable valve mechanism, and the internal combustion engine is controlled based upon the temperature of gas in the cylinder. It is therefore possible to more suitably control the internal combustion engine than when the internal combustion engine is controlled based on the temperature of the cylinder wall that is done by the device for controlling internal combustion engines taught in Japanese Unexamined Patent Publication (Kokai) No. 4-81574. Further, since the internal combustion engine is controlled based on the temperature of gas in the cylinder calculated relying upon the opening area of at least either the intake valves or the exhaust valves, it is possible to suitably control the internal combustion engine even when the opening areas of the intake and exhaust valves are varied. More specifically, the temperature of gas in the cylinder increases with an increase in the opening area of the intake valve, the temperature of gas in the cylinder being calculated based on the opening area of the intake valve, and the internal combustion engine is so controlled that the ignition timing is delayed with an increase in the temperature of gas in the cylinder.

According to a fifth aspect of the present invention, there is provided a device for controlling an internal combustion engine based on a temperature of a certain portion in the cylinder, comprising a variable valve mechanism for varying working angles of at least either the intake valves or the exhaust valves, wherein a temperature of gas in the cylinder is calculated based on the working angle of at least either the intake valve or the exhaust valve varied by the variable valve mechanism, and the internal combustion engine is controlled based on the temperature of gas in the cylinder.

In the device for controlling an internal combustion engine according to the fifth aspect of the invention, the temperature of gas in the cylinder is calculated based on the working angle of at least either the intake valve or the exhaust valve varied by the variable valve mechanism, and the internal combustion engine is controlled based upon the temperature of gas in the cylinder. It is therefore possible to suitably control the internal combustion engine better than when the internal combustion engine is controlled based on the temperature of the cylinder wall, as done by the device for controlling internal combustion engines taught in Japanese Unexamined Patent Publication (Kokai) No. 4-81574. Further, since the internal combustion engine is controlled based on the temperature of gas in the cylinder calculated relying upon the working angles of at least either the intake valves or the exhaust valves, it is possible to suitably control the internal combustion engine even when the working angles of the intake and exhaust valves are varied. More specifically, when the intake valve is fully closed after the bottom dead center in the intake stroke, the temperature of gas in the cylinder increases with an increase in the working angle of the intake valve, the temperature of gas in the cylinder being calculated based on the working angle of the intake valve, and the internal combustion engine is so controlled that the ignition timing is delayed with an increase in the temperature of gas in the cylinder. Further, when the intake valve is fully closed before the bottom dead center in the intake stroke, the temperature of gas in the cylinder increases with a decrease in the working angle of the intake valve, the temperature of gas in the cylinder being calculated based on the working angle of the intake valve, and the internal combustion engine is so controlled that the ignition timing is delayed with an increase in the temperature of gas in the cylinder.

According to a sixth aspect of the present invention, there is provided a device for controlling an internal combustion engine, comprising a variable valve mechanism for varying opening areas and working angles of at least either the intake valves or the exhaust valves, wherein a temperature of gas in the cylinder is calculated based on the opening area and the working angle of at least either the intake valve or the exhaust valve varied by the variable valve mechanism, and the internal combustion engine is controlled based on the temperature of gas in the cylinder.

Namely, in the device for controlling an internal combustion engine according to the sixth aspect of the invention, a temperature of gas in the cylinder is calculated based on the opening area and the working angle of at least either the intake valve or the exhaust valve varied by the variable valve mechanism, and the internal combustion engine is controlled based upon the temperature of gas in the cylinder. It is therefore possible to more suitably control the internal combustion engine by correctly calculating the temperature of gas in the cylinder than a case of calculating the temperature of gas in the cylinder based upon the opening areas only of the intake and exhaust valves but not upon the working angles of the intake and exhaust valves, or than a case of calculating the temperature of gas in the cylinder based upon the working angles only of the intake and exhaust valves but not upon the opening areas of the intake and exhaust valves.

According to a seventh aspect of the present invention, there is provided a device for controlling an internal combustion engine, comprising a variable valve mechanism for at least either the intake valves or the exhaust valves thereby to control the internal combustion engine based on a ratio or amount of the internal EGR gas, wherein a ratio or amount of the internal EGR gas is calculated based on the opening area of at least either the intake valve or the exhaust valve varied by the variable valve mechanism, and the internal combustion engine is controlled based on the ratio or amount of the internal EGR gas.

In the device for controlling an internal combustion engine according to the seventh aspect of the invention, a ratio or amount of the internal EGR gas is calculated based on the opening area of at least either the intake valve or the exhaust valve varied by the variable valve mechanism, and the internal combustion engine is controlled based upon the ratio or amount of the internal EGR gas. It is therefore possible to suitably control the internal combustion engine by correctly calculating the ratio or amount of the internal EGR gas without considering a change in the opening areas of the intake and exhaust valves effected by the variable valve mechanism unlike that of the device for controlling internal combustion engines taught in Japanese Unexamined Patent Publication (Kokai) No. 9-209895. Namely, even when the opening areas of the intake and exhaust valves are varied, it is possible to correctly calculate the amount of the internal EGR gas and to suitably control the internal combustion engine. More specifically, the ratio or amount of the internal EGR gas increases with an increase in the opening area of the intake valve, the ratio or amount of the internal EGR gas being calculated based on the opening area of the intake valve, and the internal combustion engine is so controlled that the ignition timing is advanced with an increase in the ratio or amount of the internal EGR gas.

According to an eighth aspect of the present invention, there is provided a device for controlling an internal combustion engine, comprising a variable valve mechanism for at least either the intake valves or the exhaust valves thereby to control the internal combustion engine based on a ratio or amount of the internal EGR gas, wherein a ratio or amount of the internal EGR gas is calculated based on the working angle of at least either the intake valve or the exhaust valve varied by the variable valve mechanism, and the internal combustion engine is controlled based on the ratio or amount of the internal EGR gas.

In the device for controlling an internal combustion engine according to the eighth aspect of the invention, a ratio or amount of the internal EGR gas is calculated based on the working angle of at least either the intake valve or the exhaust valve varied by the variable valve mechanism, and the internal combustion engine is controlled based upon the ratio or amount of the internal EGR gas. It is therefore possible to suitably control the internal combustion engine by correctly calculating the ratio or amount of the internal EGR gas without considering a change in the working angles of the intake and exhaust valves effected by the variable valve mechanism unlike that of the device for controlling internal combustion engines taught in Japanese Unexamined Patent Publication (Kokai) No. 9-209895. Namely, even when the working angles of the intake and exhaust valves are varied, it is possible to correctly calculate the amount of the internal EGR gas and to suitably control the internal combustion engine. More specifically, the ratio or amount of the internal EGR gas increases with an increase in the working angle of the intake valve, the ratio or amount of the internal EGR gas being calculated based on the working angle of the intake valve, and the internal combustion engine is so controlled that the ignition timing is advanced with an increase in the ratio or amount of the internal EGR gas.

According to a ninth aspect of the present invention, there is provided a device for controlling an internal combustion engine, wherein a ratio or amount of the internal EGR gas is calculated based on the opening areas and the working angles of at least either the intake valves or the exhaust valves varied by a variable valve mechanism, and the internal combustion engine is controlled based on the ratio or amount of the internal EGR gas.

In the device for controlling an internal combustion engine according to the ninth aspect of the invention, a ratio or amount of the internal EGR gas is calculated based on the opening area and the working angle of at least either the intake valve or the exhaust valve varied by the variable valve mechanism, and the internal combustion engine is controlled based upon the ratio or amount of the internal EGR gas. It is therefore possible to more suitably control the internal combustion engine by correctly calculating the ratio or amount of the internal EGR gas than a case of calculating the ratio or amount of the internal EGR gas based upon the opening areas only of the intake and exhaust valves but not upon the working angles of the intake and exhaust valves, or than a case of calculating the ratio or amount of the internal EGR gas based upon the working angles only of the intake and exhaust valves but not upon the opening areas of the intake and exhaust valves.

According to a tenth aspect of the present invention, there is provided a device for controlling an internal combustion engine, comprising a variable valve mechanism for at least either the intake valves or the exhaust valves thereby to control the internal combustion engine based on a degree of turbulence in the cylinder that is estimated based on the opening area of the intake valve varied by the variable valve mechanism, wherein it is so estimated that a degree of turbulence in the cylinder increases with a decrease in the opening area of the intake valve varied by the variable valve mechanism, and the internal combustion engine is controlled based on the estimated degree of turbulence in the cylinder.

In the device for controlling an internal combustion engine according to the tenth aspect of the invention, it is estimated that a degree of turbulence in the cylinder increases with a decrease in the opening area of the intake valve varied by the variable valve mechanism, and the internal combustion engine is controlled based upon the estimated degree of turbulence in the cylinder. Even when the opening area of the intake valve is varied by the variable valve mechanism, therefore, the degree of turbulence in the cylinder is correctly estimated and the internal combustion engine is suitably controlled unlike that of using the device for controlling internal combustion engines taught in Japanese Unexamined Patent Publication (Kokai) No. 2000-73800 according to which it is so estimated that a degree of turbulence in the cylinder decreases with a decrease in the opening area of the intake valve, and the internal combustion engine is controlled based on the estimated degree of turbulence in the cylinder. More specifically, the degree of turbulence in the cylinder increases with a decrease in the opening area of the intake valve, the degree of turbulence in the cylinder being estimated based on the opening area of the intake valve, and the internal combustion engine is so controlled that the ignition timing is delayed with an increase in the degree of turbulence in the cylinder.

BRIEF DESCRIPTION OF THE DRAWINGS

FIG. 9 is a diagram illustrating a relationship among the normal condition of pressure PCYLb in the cylinder at the compression top dead center, the valve-lifting amount LT and the pressure PM in the intake pipe;

FIG. 10 is a diagram illustrating a relationship among the normal condition of pressure PCYLb in the cylinder at the compression top dead center, the working angle VA and the pressure PM in the intake pipe;

BEST MODE FOR CARRYING OUT THE INVENTION

Embodiments of the invention will now be described with reference to the accompanying drawings.

Figure 1:
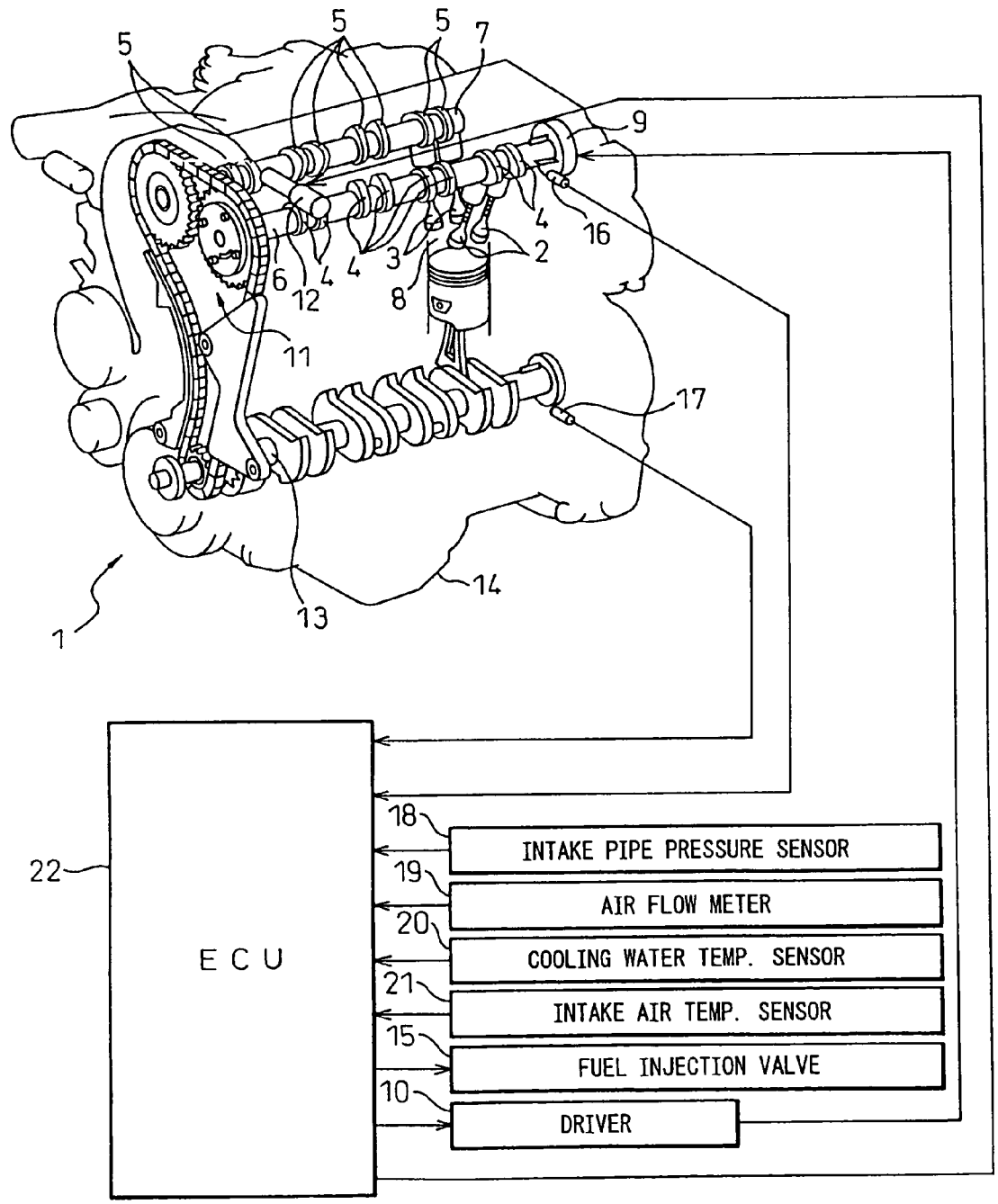
FIG. 1 is a view schematically illustrating a first embodiment of a device for controlling an internal combustion engine according to the present invention.
Figure 2:
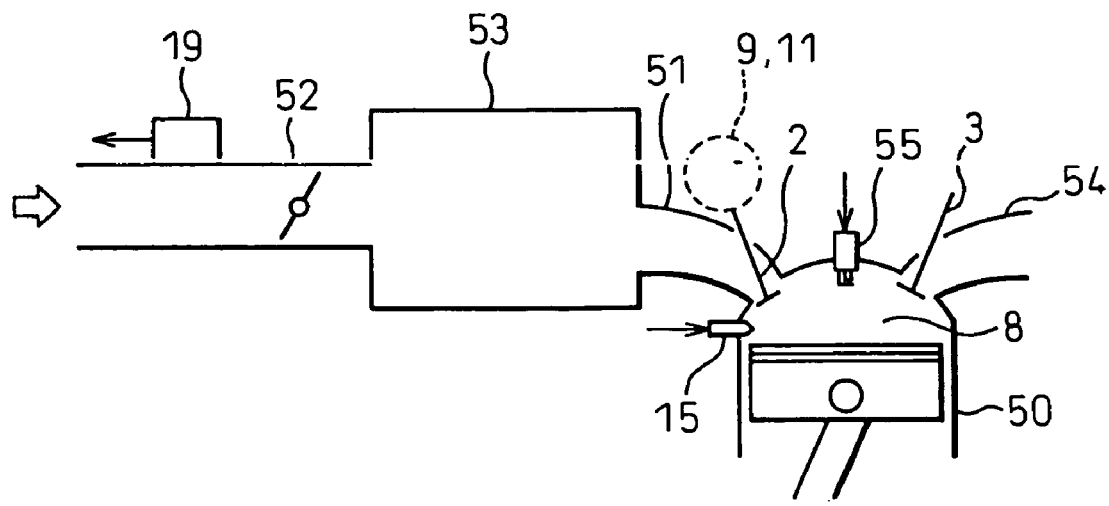
FIG. 2 is a view illustrating, in detail, an intake system of the device for controlling an internal combustion engine shown in FIG. 1.
Figure 3:
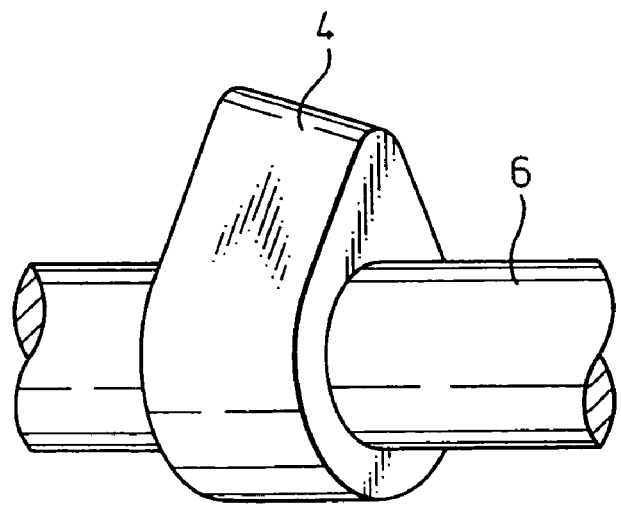
FIG. 3 is a view illustrating in detail a cam for an intake valve and a cam shaft shown in FIG. 1.

FIG. 1 is a view schematically illustrating a first embodiment of a device for controlling an internal combustion engine according to the present invention, and FIG. 2 is a view illustrating, in detail, an intake system of the device for controlling an internal combustion engine shown in FIG. 1. In FIGS. 1 and 2, reference numeral 1 denotes an internal combustion engine, 2 denotes intake valves, 3 denotes exhaust valves, 4 denotes cams for opening and closing the intake valves, 5 denotes cams for opening and closing the exhaust valves, 6 denotes a cam shaft supporting the cams 4 for intake valves, and 7 denotes a cam shaft supporting the cams 5 for exhaust valves. FIG. 3 is a view illustrating in detail the cam for the intake valve and the cam shaft shown in FIG. 1. As shown in FIG. 3, the cam 4 according to this embodiment has a cam profile that is changing in the direction of the center axis of the cam shaft. That is, the cam 4 according to this embodiment has a nose at the left end in FIG. 3 which is higher than a nose at the right end. That is, the valve-lifting amount of the intake valve 2 according to this embodiment is smaller when the valve lifter is in contact with the right end of the cam 4 than when the valve lifter is in contact with the left end of the cam 4.

Reverting to FIGS. 1 and 2, reference numeral 8 denotes a combustion chamber formed in the cylinder, and 9 denotes a device for changing the valve-lifting amount by moving the cam 4 in a direction of the center axis of the cam shaft in order to change the valve-lifting amount. Namely, upon operating the device 9 for changing the valve-lifting amount, the valve lifter is brought into contact with the cam 4 at the left end (FIG. 3) of the cam 4 or the valve lifter is brought into contact with the cam 4 at the right end (FIG. 3) of the cam 4. When the valve-lifting amount of the intake valve 2 is changed by the device 9 for changing the valve-lifting amount, the opening area of the intake valve 2 changes. With the intake valve 2 of this embodiment, the opening area of the intake valve 2 increases with an increase in the valve-lifting amount. Reference numeral 10 denotes a driver for driving the device 9 for changing the valve-lifting amount, and 11 denotes an opening/closing timing shifting device for shifting the opening/closing timing of the intake valve without changing the valve-opening period of the intake valve 2. Namely, by operating the opening/closing timing shifting device 11, the opening/closing timing of the intake valve 2 can be shifted toward the advancing side or toward the delaying side. Reference numeral 12 denotes an oil control valve for controlling the hydraulic pressure for actuating the opening/closing timing shifting device 11. The variable valve mechanism according to this embodiment includes both the device 9 for changing the valve-lifting amount and the opening/closing timing shifting device 11.

Reference numeral 13 denotes a crank shaft, 14 denotes an oil pan, 15 denotes a fuel injection valve, 16 denotes a sensor for detecting the valve-lifting amount of the intake valve 2 and the amount of shifting the opening/closing timing, and reference numeral 17 denotes a sensor for detecting the engine rotational speed. Reference numeral 18 denotes an intake pipe pressure sensor for detecting the pressure in the intake pipe through which the intake air is fed into the cylinder, 19 denotes an air flow meter, 20 denotes a cooling water temperature sensor for detecting the temperature of the internal combustion engine cooling water, 21 denotes an intake air temperature sensor for detecting the temperature of the intake air fed into the cylinder through the intake pipe, and 22 denotes an ECU (electronic control unit). Reference numeral 50 denotes a cylinder, 51 and 52 denote intake pipes, 53 denotes a surge tank, 54 denotes an exhaust pipe, and 55 denotes a spark plug.

Figure 4:
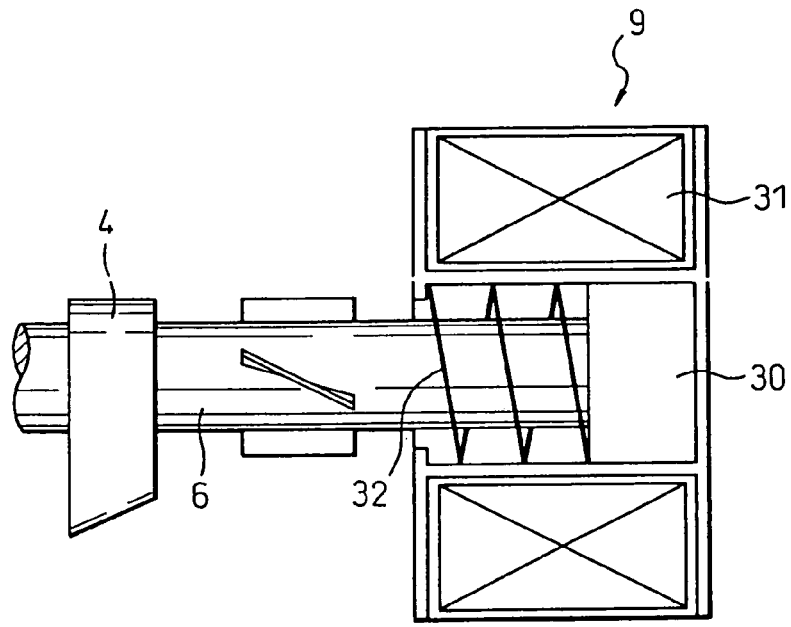
FIG. 4 is a view illustrating in detail a device for changing the valve-lifting amount shown in FIG. 1.

FIG. 4 is a view illustrating in detail the device for changing the valve-lifting amount shown in FIG. 1. In FIG. 4, reference numeral 30 denotes a magnetic material coupled to the cam shaft 6 for the intake valves, 31 denotes a coil for urging the magnetic material 30 toward the left, and 32 denotes a compression spring for urging the magnetic material 30 toward the right. As the amount of electric current supplied to the coil 31 increases, the cam 4 and the cam shaft 6 move toward the left by an increased amount, and the valve-lifting amount of the intake valve 2 decreases.

Figure 5:
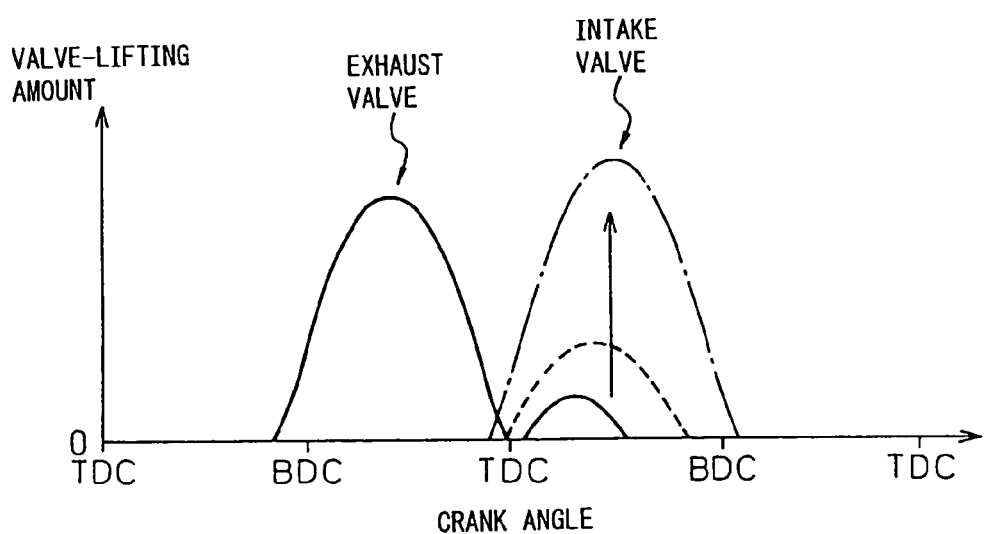
FIG. 5 is a diagram illustrating a change in the valve-lifting amount of the intake valve accompanying the operation of the device for changing the valve-lifting amount.

FIG. 5 is a diagram illustrating a change in the valve-lifting amount of the intake valve accompanying the operation of the device for changing the valve-lifting amount. Referring to FIG. 5, as the amount of electric current supplied to the coil 31 decreases, the valve-lifting amount of the intake valve 2 increases (solid line→broken line→dot-dash chain line). In this embodiment, further, the valve-opening period of the intake valve 2 varies accompanying the operation of the device 9 for changing the valve-lifting amount. Namely, the working angle of the intake valve 2 changes, too. If described in detail, the working angle of the intake valve 2 increases (solid line→broken line→dot-dash chain line) accompanying an increase in the valve-lifting amount of the intake valve 2. In this embodiment, further, the timing at which the valve-lifting amount of the intake valve 2 becomes a peak also varies accompanying the operation of the device 9 for changing the valve-lifting amount. If described in detail, the timing at which the valve-lifting amount of the intake valve 2 becomes a peak is delayed (solid line→broken line→dot-dash chain line) accompanying an increase in the valve-lifting amount of the intake valve 2.

Figure 6:
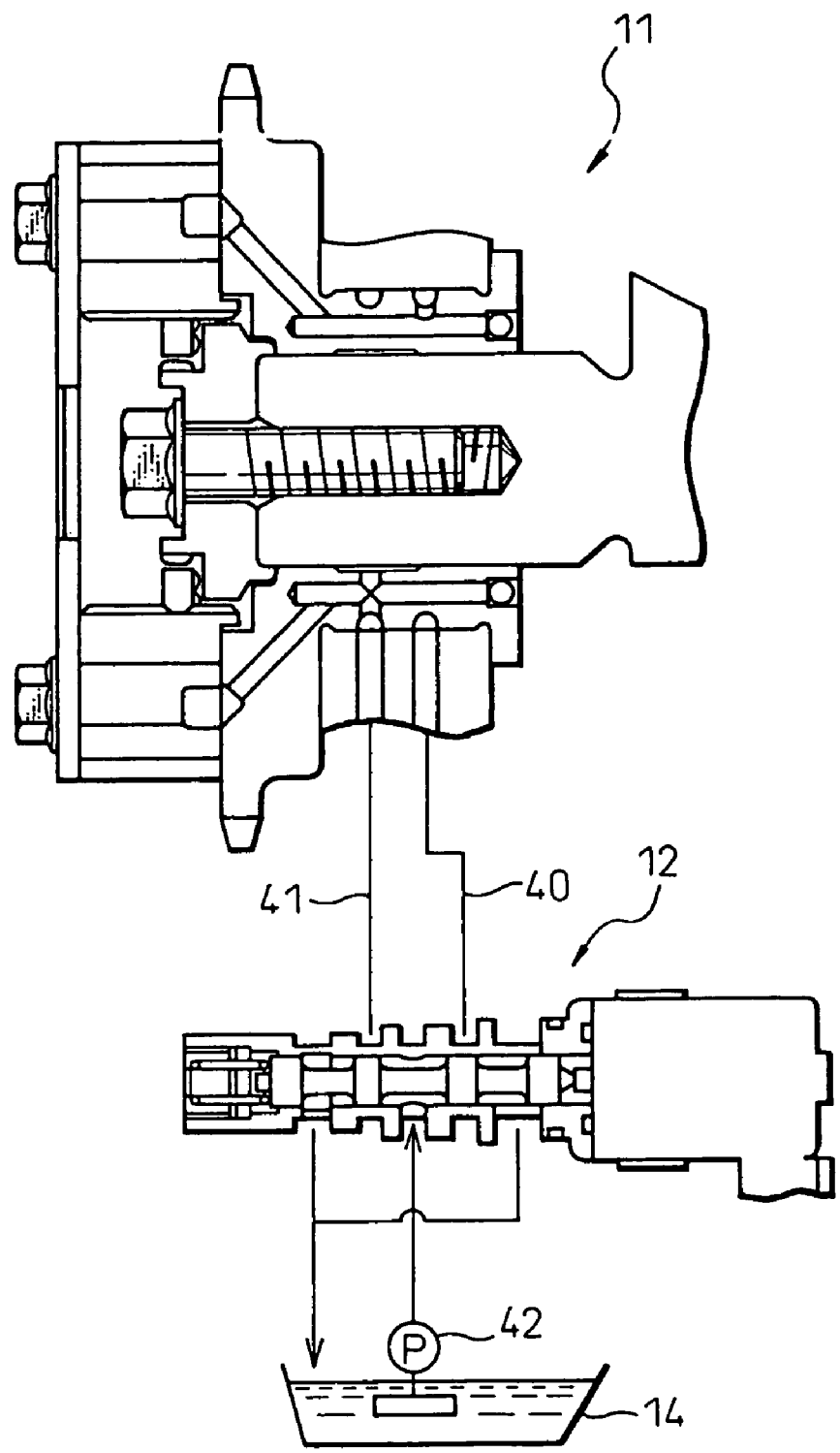
FIG. 6 is a view illustrating in detail an opening/closing timing shifting device shown in FIG. 1.

FIG. 6 is a view illustrating in detail the opening/closing timing shifting device shown in FIG. 1. In FIG. 6, reference numeral 40 denotes a fluid passage on the advancing side for shifting the opening/closing timing of the intake valve 2 toward the advancing side, reference numeral 41 denotes a fluid passage on the delaying side for shifting the opening/closing timing of the intake valve 2 toward the delaying side, and 42 denotes an oil pump. As the hydraulic pressure increases in the fluid passage 40 on the advancing side, the opening/closing timing of the intake valve 2 is shifted toward the advancing side. Namely, the rotational phase of the cam shaft 6 is advanced with respect to the crank shaft 13. As the hydraulic pressure increases in the fluid passage 41 on the delaying side, on the other hand, the opening/closing timing of the intake valve 2 is shifted toward the delaying side. Namely, the rotational phase of the cam shaft 6 is delayed with respect to the crank shaft 13.

Figure 7:
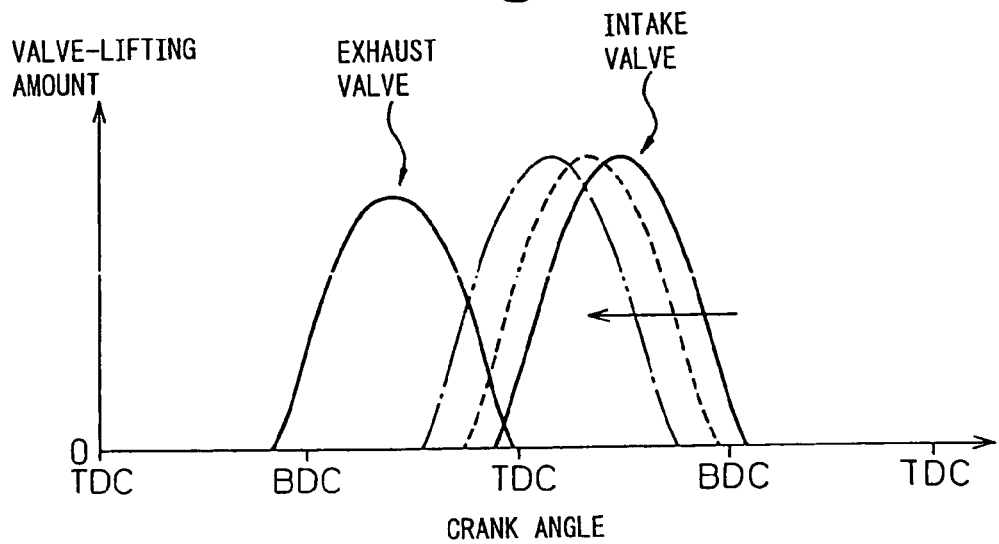
FIG. 7 is a diagram illustrating how the opening/closing timing of the intake valve shifts accompanying the operation of the opening/closing timing shifting device.

FIG. 7 is a diagram illustrating how the opening/closing timing of the intake valve shifts accompanying the operation of the opening/closing timing shifting device. As the hydraulic pressure increases in the fluid passage 40 on the advancing side as shown in FIG. 7, the opening/closing timing of the intake valve 2 is shifted toward the advancing side (solid line→broken line→dot-dash chain line). Here, the valve-opening period of the intake valve 2 remains unchanged. Namely, there is no change in the length of period in which the intake valve 2 remains opened.

As the valve-lifting amount of the intake valve 2, working angle and the opening/closing timing (phase) are varied by the device 9 for changing the valve-lifting amount and by the opening/closing timing shifting device 11 as described above, then, the pressure in the cylinder varies. If the ignition is conducted at a predetermined timing irrespective of a change in the pressure in the cylinder, an optimum ignition timing is not accomplished, and the internal combustion engine is not suitably controlled. In order to conduct the ignition at an optimum timing and to suitably control the internal combustion engine, therefore, the pressure in the cylinder must be correctly calculated depending upon changes in the valve-lifting amount of the intake valve 2, upon the working angle and upon the opening/closing timing (phase) thereof.

Figure 8:
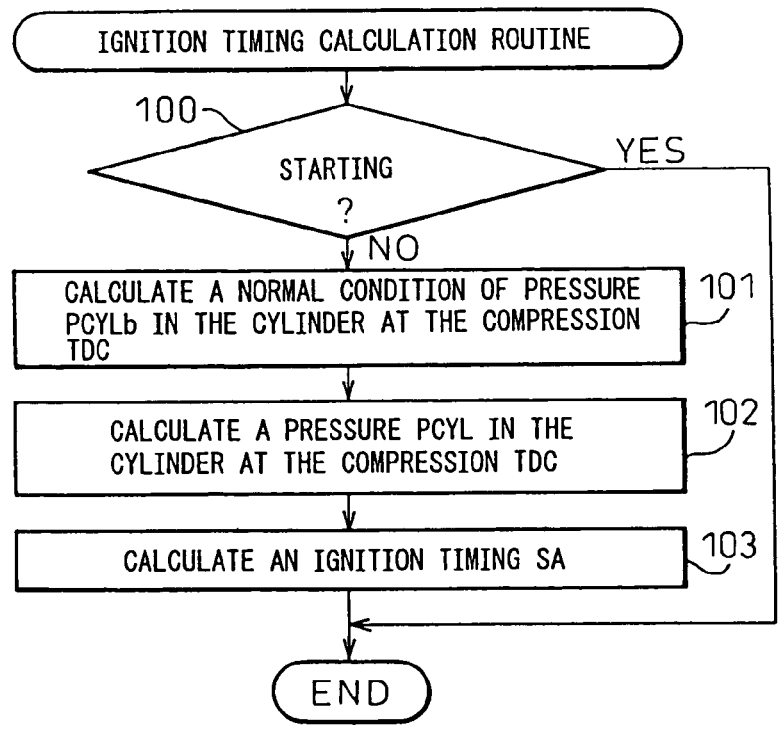
FIG. 8 is a flowchart illustrating a method of calculating the ignition timing according to the first embodiment.

FIG. 8 is a flowchart illustrating a method of calculating the ignition timing according to the embodiment. This routine is executed at predetermined time intervals. When the routine starts as shown in FIG. 8, it is, first, judged at step 100 if the engine is being started. When the result is YES, the pressure in the cylinder is correctly calculated at the start of the engine where the amount of the fuel is being increased, it is so judged based thereupon that there is no need to determine the ignition timing, and the routine ends. When the result is NO, on the other hand, the routine proceeds to step 101. At step 101, the normal condition of pressure PCYLb in the cylinder at the compression top dead center is calculated based on the valve-lifting amount LT of the intake valve 2, working angle VA, opening/closing timing VT, pressure PM in the intake pipe and the engine rotational speed NE.

Figure 11:
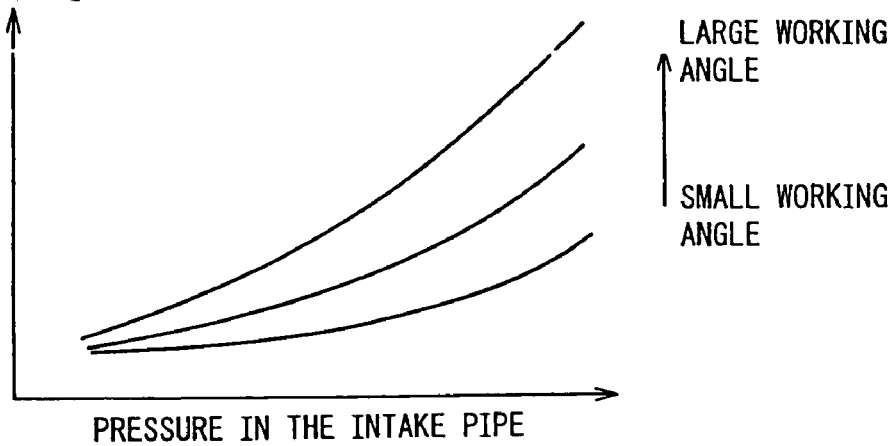
FIG. 11 is a diagram illustrating a relationship among the normal condition of pressure PCYLb in the cylinder at the compression top dead center, the working angle VA and the pressure PM in the intake pipe.

FIG. 9 is a diagram illustrating a relationship among the normal condition of pressure PCYLb in the cylinder at the compression top dead center, the valve-lifting amount LT and the pressure PM in the intake pipe. As shown in FIG. 9, the normal condition of pressure PCYLb in the cylinder at the compression top dead center calculated at step 101 increases with an increase in the valve-lifting amount LT, or increases with an increase in the pressure PM in the intake pipe. FIG. 10 is a diagram illustrating a relationship among the normal condition of pressure PCYLb in the cylinder at the compression top dead center, the working angle VA and the pressure PM in the intake pipe. As shown in FIG. 10, the normal condition of pressure PCYLb in the cylinder at the compression top dead center calculated at step 101 increases with a decrease in the working angle VA when the intake valve 2 is fully closed after the intake bottom dead center. FIG. 11 is a diagram illustrating a relationship among the normal condition of pressure PCYLb in the cylinder at the compression top dead center, the working angle VA and the pressure PM in the intake pipe. As shown in FIG. 11, the normal condition of pressure PCYLb in the cylinder at the compression top dead center calculated at step 101 increases with an increase in the working angle VA when the intake valve 2 is fully closed before the intake bottom dead center.

Figure 12:
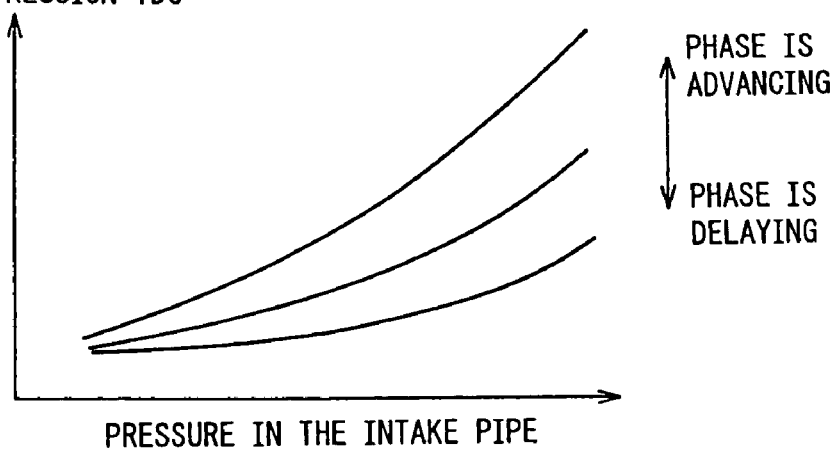
FIG. 12 is a diagram illustrating a relationship among the normal condition of pressure PCYLb in the cylinder at the compression top dead center, the opening/closing timing (phase) VT and the pressure PM in the intake pipe.
Figure 13:
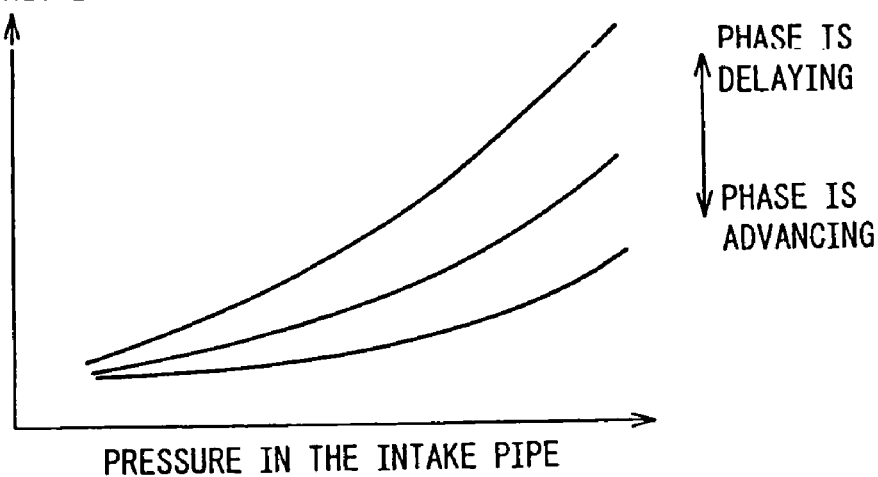
FIG. 13 is a diagram illustrating a relationship among the normal condition of pressure PCYLb in the cylinder at the compression top dead center, the opening/closing timing (phase) VT and the pressure PM in the intake pipe.
Figure 14:
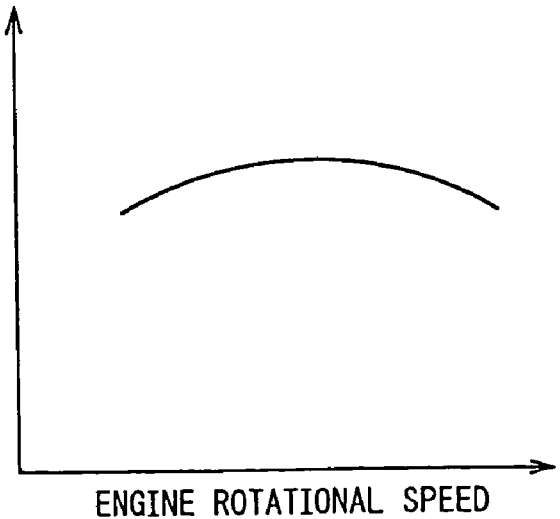
FIG. 14 is a diagram illustrating a relationship between the normal condition of pressure PCYLb in the cylinder at the compression top dead center and the engine rotational speed NE.

FIG. 12 is a diagram illustrating a relationship among the normal condition of pressure PCYLb in the cylinder at the compression top dead center, the opening/closing timing (phase) VT and the pressure PM in the intake pipe. As shown in FIG. 12, the normal condition of pressure PCYLb in the cylinder at the compression top dead center calculated at step 101 increases as the opening/closing timing (phase) VT advances when the intake valve 2 is fully closed after the intake bottom dead center. FIG. 13 is a diagram illustrating a relationship among the normal condition of pressure PCYLb in the cylinder at the compression top dead center, the opening/closing timing (phase) VT and the pressure PM in the intake pipe. As shown in FIG. 13, the normal condition of pressure PCYLb in the cylinder at the compression top dead center calculated at step 101 increases as the opening/closing timing (phase) VT delays when the intake valve 2 is fully closed before the intake bottom dead center. FIG. 14 is a diagram illustrating a relationship between the normal condition of pressure PCYLb in the cylinder at the compression top dead center and the engine rotational speed NE. As shown in FIG. 14, the normal condition of pressure PCYLb in the cylinder at the compression top dead center calculated at step 101 becomes a peak when the engine rotational speed NE is an intermediate speed.

Figure 15:
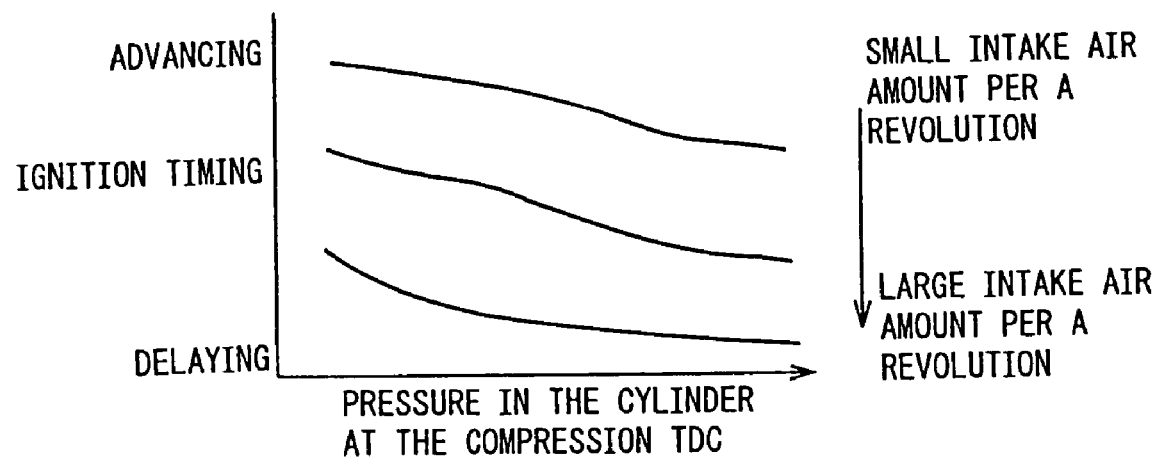
FIG. 15 is a diagram illustrating a relationship among the ignition timing SA, the pressure PCYL in the cylinder at the compression top dead center, and the intake air amount GN taken in by the cylinder per one revolution.
Figure 16:
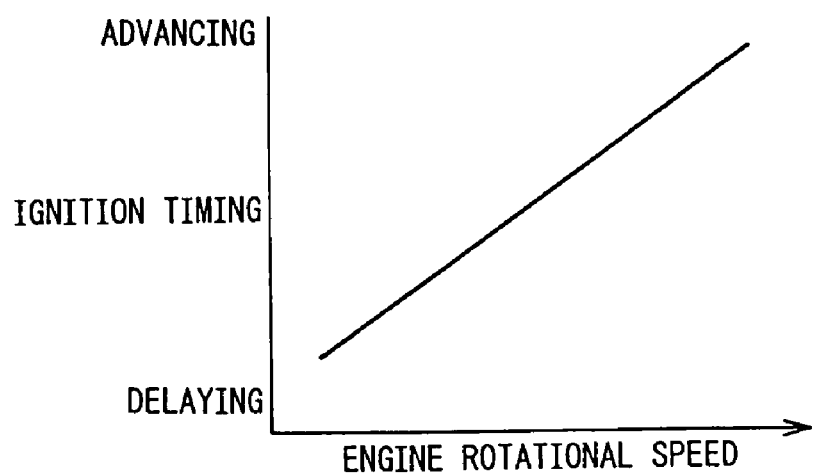
FIG. 16 is a diagram illustrating a relationship between the ignition timing SA and the engine rotational speed NE.

Reverting to the description of FIG. 8, a pressure PCYL in the cylinder at the compression top dead center is calculated at step 102 from the normal condition of pressure PCYLb in the cylinder at the compression top dead center under the present engine operating conditions. Then, at step 103, an ignition timing SA is calculated based on the pressure PCYL in the cylinder at the compression top dead center, engine rotational speed NE, and intake air amount GN taken in by the cylinder per a revolution, i.e., the intake air amount GN taken in by the cylinder during one time of intake stroke. FIG. 15 is a diagram illustrating a relationship among the ignition timing SA, the pressure PCYL in the cylinder at the compression top dead center, and the intake air amount GN taken in by the cylinder per one revolution. As shown in FIG. 15, the ignition timing SA calculated at step 103 is delayed as the pressure PCYL increases in the cylinder at the compression top dead center, and is delayed with an increase in the intake air amount GN taken in by the cylinder per one revolution. FIG. 16 is a diagram illustrating a relationship between the ignition timing SA and the engine rotational speed NE. As shown in FIG. 16, the ignition timing SA calculated at step 103 advances with an increase in the engine rotational speed NE.

In this embodiment as described above, a pressure in the cylinder (pressure PCYL in the cylinder at the compression top dead center) is calculated at steps 101 and 102 in FIG. 8 based on the opening area of the intake valve 2 that varies depending upon the valve-lifting amount LT varied by the device 9 for changing the valve-lifting amount which is the variable valve mechanism, and the internal combustion engine is controlled based on the pressure in the cylinder. According to this embodiment, therefore, the internal combustion engine can be controlled based not only upon the peak combustion pressure in the cylinder but also upon the pressure in the cylinder at a moment other than the peak combustion pressure unlike the case of detecting the pressure in the cylinder by using the cylinder pressure sensor employed by the device for controlling internal combustion engines taught in Japanese Unexamined Patent Publication (Kokai) No. 9-53503. The internal combustion engine can be suitably controlled even when the opening area of the intake valve 2 is varied. More specifically, the pressure in the cylinder calculated based on the opening area of the intake valve increases with an increase in the opening area of the intake valve 2 as shown in FIG. 9, and the internal combustion engine is so controlled that the ignition timing SA is delayed with an increase in the pressure in the cylinder as shown in FIG. 15.

In this embodiment, further, the pressure in the cylinder (pressure PCYL in the cylinder at the compression top dead center) is calculated at steps 101 and 102 in FIG. 8 based on the working angle VA of the intake valve 2 that is varied by the device 9 for changing the valve-lifting amount which is the variable valve mechanism, and the internal combustion engine is controlled based on the pressure in the cylinder. According to this embodiment, therefore, the internal combustion engine can be controlled based not only upon the peak combustion pressure in the cylinder but also upon the pressure in the cylinder at a moment other than the peak combustion pressure unlike the case of detecting the pressure in the cylinder by using the cylinder pressure sensor employed by the device for controlling internal combustion engines taught in Japanese Unexamined Patent Publication (Kokai) No. 9-53503. The internal combustion engine can be suitably controlled even when the working angle VA of the intake valve 2 is varied. More specifically, the pressure in the cylinder calculated based on the working angle VA of the intake valve 2 increases with a decrease in the working angle VA of the intake valve 2 when the intake valve 2 is fully closed after the intake bottom dead center as shown in FIG. 10, and the internal combustion engine is so controlled that the ignition timing SA is delayed with an increase in the pressure in the cylinder as shown in FIG. 15. Further, the pressure in the cylinder calculated based on the working angle VA of the intake valve 2 increases with an increase in the working angle VA of the intake valve 2 when the intake valve 2 is fully closed before the intake bottom dead center as shown in FIG. 11, and the internal combustion engine is so controlled that the ignition timing SA is delayed with an increase in the pressure in the cylinder as shown in FIG. 15.

In this embodiment, further, the pressure in the cylinder (pressure PCYL in the cylinder at the compression top dead center) is calculated at steps 101 and 102 in FIG. 8 based on both the opening area and the working angle VA of the intake valve 2 that are varied by the device 9 for changing the valve-lifting amount which is the variable valve mechanism, and the internal combustion engine is controlled based on the pressure in the cylinder. According to this embodiment, therefore, the internal combustion engine can be suitably controlled by more correctly calculating the pressure in the cylinder than when the pressure in the cylinder is calculated based only upon the opening area of the intake valve 2 but not upon the working angle VA of the intake valve 2, or than when the pressure in the cylinder is calculated based only upon the working angle VA of the intake valve 2 but not upon the opening area of the intake valve 2.

In this embodiment, further, the pressure in the cylinder (pressure PCYL in the cylinder at the compression top dead center) is calculated at steps 101 and 102 in FIG. 8 based upon the opening/closing timing (phase) VT of the intake valve 2, pressure PM in the intake pipe and engine rotational speed NE, and the internal combustion engine is controlled based on the pressure in the cylinder. According to this embodiment, therefore, the internal combustion engine can be suitably controlled by more correctly calculating the pressure in the cylinder than when the pressure in the cylinder is not calculated based on the opening/closing timing (phase) VT of the intake valve 2, pressure PM in the intake pipe and engine rotational speed NE.

In this embodiment, the pressure in the cylinder is calculated based on the opening area of the intake valve and the like, and the internal combustion engine is controlled based on the pressure in the cylinder. According to another embodiment, the pressure in the cylinder is calculated based on the opening areas of the exhaust valves, and the internal combustion engine is controlled based on the pressure in the cylinder. Namely, the invention can be applied not only to the intake valves but also to the exhaust valves.

Described below is a second embodiment of the device for controlling an internal combustion engine according to the invention. The constitution of this embodiment is nearly the same as the constitution of the first embodiment illustrated in FIGS. 1 to 7. In this embodiment, too, the pressure in the cylinder varies as the valve-lifting amount of the intake valve 2, working angle and opening/closing timing (phase) are varied by the device 9 for changing the valve-lifting amount and by the opening/closing timing shifting device 11. If the amount of fuel injection is set to be constant irrespective of a change in the pressure in the cylinder, the real air-fuel ratio deviates from a target air-fuel ratio, and the internal combustion engine is not suitably controlled. In order to calculate an optimum amount of fuel injection and to suitably control the internal combustion engine, therefore, the pressure in the cylinder must be correctly calculated depending upon the valve-lifting amount of the intake valve 2, upon the working angle and upon the opening/closing timing (phase) thereof.

Figure 17:
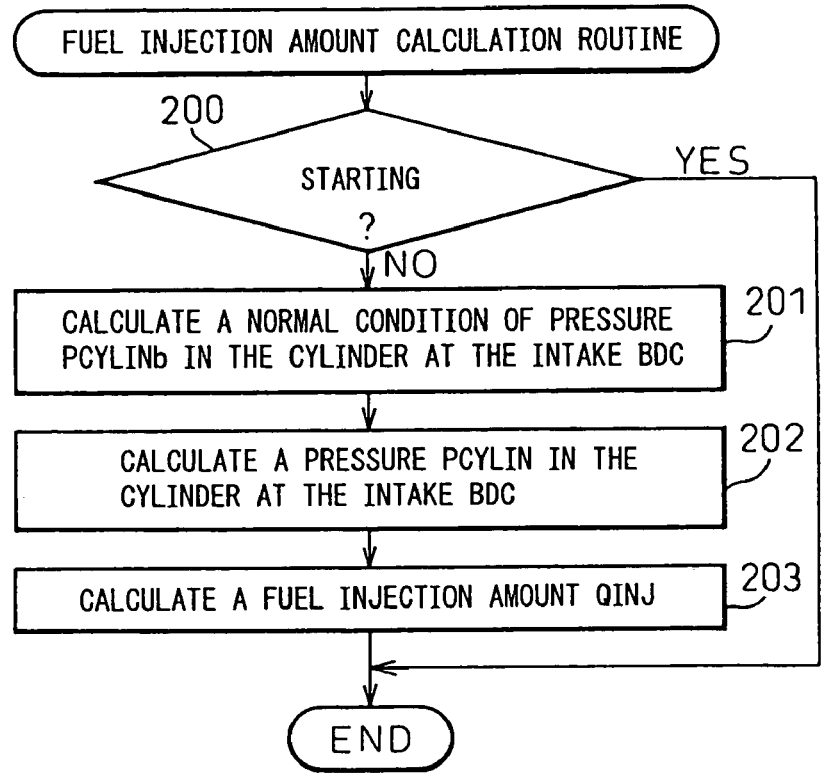
FIG. 17 is a flowchart illustrating a method of calculating the amount of fuel injection according to a second embodiment.

FIG. 17 is a flowchart illustrating a method of calculating the amount of fuel injection according to the embodiment. This routine is executed at predetermined time intervals. When the routine starts as shown in FIG. 17, it is first judged at step 200 if the engine is being started. When the result is YES, the amount of fuel injection is determined irrespective of the pressure in the cylinder at the start of the engine where the amount of the fuel is being increased, it is so judged based thereupon that there is no need to correctly calculate the pressure in the cylinder for determining the amount of fuel injection, and the routine ends. When the result is NO, on the other hand, the routine proceeds to step 201. At step 201, the normal condition of pressure PCYLINb in the cylinder at the intake bottom dead center is calculated based on the valve-lifting amount LT of the intake valve 2, working angle VA, opening/closing timing VT, pressure PM in the intake pipe and the engine rotational speed NE.

Figure 18:
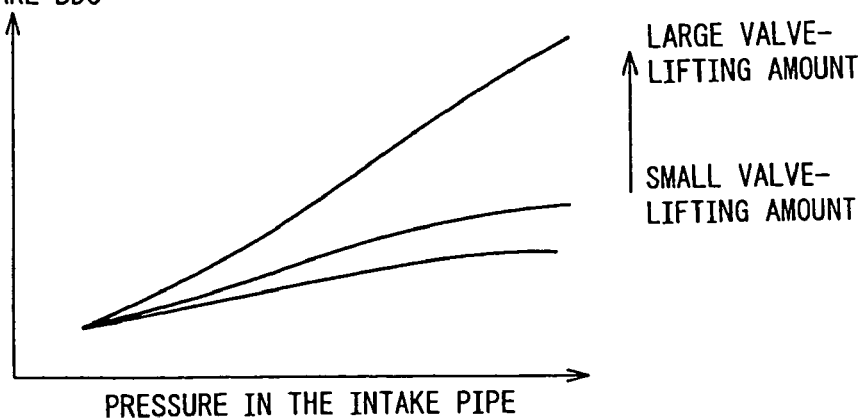
FIG. 18 is a diagram illustrating a relationship among the normal condition of pressure PCYLINb in the cylinder at the intake bottom dead center, the valve-lifting amount LT and the pressure PM in the intake pipe.
Figure 19:
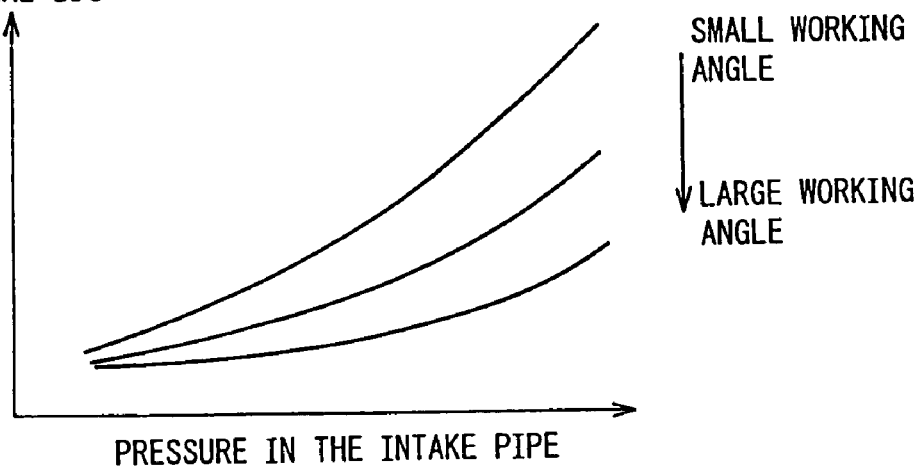
FIG. 19 is a diagram illustrating a relationship among the normal condition of pressure PCYLINb in the cylinder at the intake bottom dead center, the working angle VA and the pressure PM in the intake pipe.

FIG. 18 is a diagram illustrating a relationship among the normal condition of pressure PCYLINb in the cylinder at the intake bottom dead center, the valve-lifting amount LT and the pressure PM in the intake pipe. As shown in FIG. 18, the normal condition of pressure PCYLINb in the cylinder at the intake bottom dead center calculated at step 201 increases with an increase in the valve-lifting amount LT, or increases with an increase in the pressure PM in the intake pipe. FIG. 19 is a diagram illustrating a relationship among the normal condition of pressure PCYLINb in the cylinder at the intake bottom dead center, the working angle VA and the pressure PM in the intake pipe. As shown in FIG. 19, the normal condition of pressure PCYLINb in the cylinder at the intake bottom dead center calculated at step 201 increases with a decrease in the working angle VA.

Figure 20:
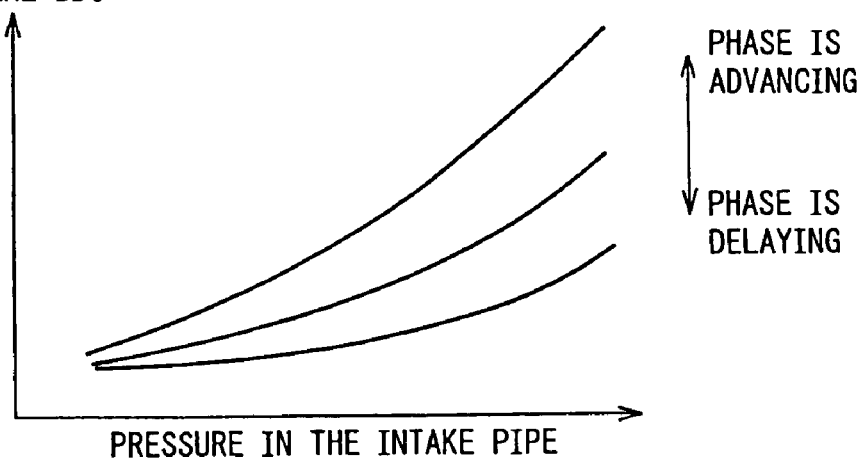
FIG. 20 is a diagram illustrating a relationship among the normal condition of pressure PCYLINb in the cylinder at the intake bottom dead center, the opening/closing timing (phase) VT and the pressure PM in the intake pipe.
Figure 21:
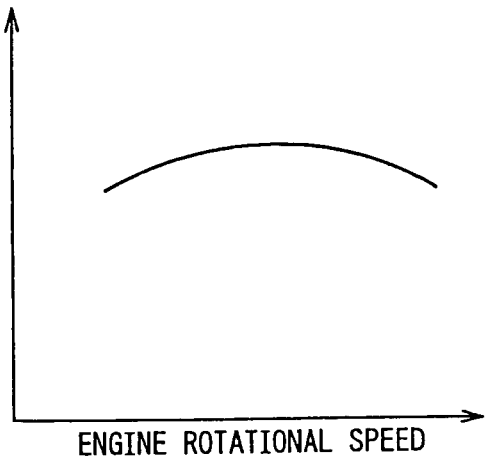
FIG. 21 is a diagram illustrating a relationship between the normal condition of pressure PCYLINb in the cylinder at the intake bottom dead center and the engine rotational speed NE.

FIG. 20 is a diagram illustrating a relationship among the normal condition of pressure PCYLINb in the cylinder at the intake bottom dead center, the opening/closing timing (phase) VT and the pressure PM in the intake pipe. As shown in FIG. 20, the normal condition of pressure PCYLINb in the cylinder at the intake bottom dead center calculated at step 201 increases as the opening/closing timing (phase) VT advances. FIG. 21 is a diagram illustrating a relationship between the normal condition of pressure PCYLINb in the cylinder at the intake bottom dead center and the engine rotational speed NE. As shown in FIG. 21, the normal condition of pressure PCYLINb in the cylinder at the intake bottom dead center calculated at step 201 becomes a peak when the engine rotational speed NE is an intermediate speed.

Figure 22:
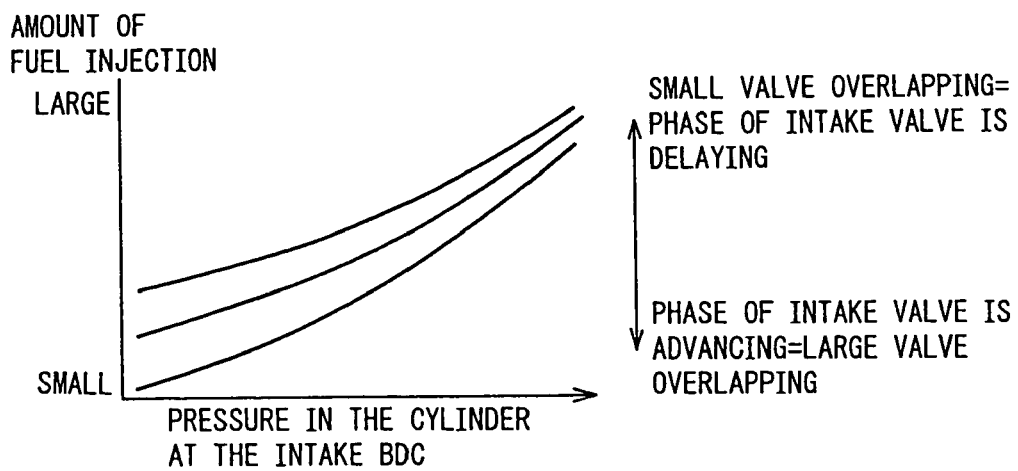
FIG. 22 is a diagram illustrating a relationship among the fuel injection amount QINJ, the pressure PCYLIN in the cylinder at the intake bottom dead center, and the opening/closing timing (phase, valve overlapping) VT.

Reverting to the description of FIG. 17, the pressure PCYLIN in the cylinder at the intake bottom dead center is calculated at step 202 from the normal condition of pressure PCYLINb in the cylinder at the intake bottom dead center under the present engine operating conditions. Then, at step 203, the fuel injection amount QINJ is calculated based on the pressure PCYLIN in the cylinder at the intake bottom dead center and opening/closing timing (phase, valve overlapping) VT. FIG. 22 is a diagram illustrating a relationship among the fuel injection amount QINJ, the pressure PCYLIN in the cylinder at the intake bottom dead center, and the opening/closing timing (phase, vave overlapping) VT. As shown in FIG. 22, the fuel injection amount QINJ calculated at step 203 increases as the pressure PCYLIN increases in the cylinder at the intake bottom dead center, and increases as the opening/closing timing (phase) VT is delayed, i.e., as the valve overlapping period between the intake valve 2 and the exhaust valve 3 decreases.

In this embodiment as described above, the pressure in the cylinder (pressure PCYLIN in the cylinder at the intake bottom dead center) is calculated at steps 201 and 202 in FIG. 17 based on the opening area of the intake valve 2 that varies depending upon the valve-lifting amount LT varied by the device 9 for changing the valve-lifting amount which is the variable valve mechanism, and the internal combustion engine is controlled based on the pressure in the cylinder. According to this embodiment, therefore, the internal combustion engine can be controlled based not only upon the peak combustion pressure in the cylinder but also upon the pressure in the cylinder at a moment other than the peak combustion pressure unlike the case of detecting the pressure in the cylinder by using the cylinder pressure sensor employed by the device for controlling internal combustion engines taught in Japanese Unexamined Patent Publication (Kokai) No. 9-53503. The internal combustion engine can be suitably controlled even when the opening area of the intake valve 2 is varied. More specifically, the pressure in the cylinder calculated based on the opening area of the intake valve increases with an increase in the opening area of the intake valve 2 as shown in FIG. 18, and the internal combustion engine is so controlled that the fuel injection amount QINJ increases with an increase in the pressure in the cylinder as shown in FIG. 22.

In this embodiment, further, the pressure in the cylinder (pressure PCYLIN in the cylinder at the intake bottom dead center) is calculated at steps 201 and 202 in FIG. 17 based on the working angle VA of the intake valve 2 that is varied by the device 9 for changing the valve-lifting amount which is the variable valve mechanism, and the internal combustion engine is controlled based on the pressure in the cylinder. According to this embodiment, therefore, the internal combustion engine can be controlled based not only upon the peak combustion pressure in the cylinder but also upon the pressure in the cylinder at a moment other than the peak combustion pressure unlike the case of detecting the pressure in the cylinder by using the cylinder pressure sensor employed by the device for controlling internal combustion engines taught in Japanese Unexamined Patent Publication (Kokai) No. 9-53503. The internal combustion engine can be suitably controlled even when the working angle VA of the intake valve 2 is varied. More specifically, the pressure in the cylinder calculated based on the working angle VA of the intake valve 2 increases with a decrease in the working angle VA of the intake valve 2 as shown in FIG. 19, and the internal combustion engine is so controlled that the fuel injection amount QINJ increases with an increase in the pressure in the cylinder as shown in FIG. 22.

In this embodiment, further, the pressure in the cylinder (pressure PCYLIN in the cylinder at the intake bottom dead center) is calculated at steps 201 and 202 in FIG. 17 based on both the opening area and the working angle VA of the intake valve 2 that are varied by the device 9 for changing the valve-lifting amount which is the variable valve mechanism, and the internal combustion engine is controlled based on the pressure in the cylinder. According to this embodiment, therefore, the internal combustion engine can be suitably controlled by more correctly calculating the pressure in the cylinder than when the pressure in the cylinder is calculated based only upon the opening area of the intake valve 2 but not upon the working angle VA of the intake valve 2, or than when the pressure in the cylinder is calculated based only upon the working angle VA of the intake valve 2 but not upon the opening area of the intake valve 2.

In this embodiment, further, the pressure in the cylinder (pressure PCYLIN in the cylinder at the intake bottom dead center) is calculated at steps 201 and 202 in FIG. 17 based on the opening/closing timing (phase) VT of the intake valve 2, pressure PM in the intake pipe and engine rotational speed NE, and the internal combustion engine is controlled based on the pressure in the cylinder. According to this embodiment, therefore, the internal combustion engine can be suitably controlled by more correctly calculating the pressure in the cylinder than when the pressure in the cylinder is not calculated based on the opening/closing timing (phase) VT of the intake valve 2, pressure PM in the intake pipe and engine rotational speed NE.

In this embodiment, the pressure in the cylinder is calculated based on the opening area of the intake valve and the like, and the internal combustion engine is controlled based on the pressure in the cylinder. According to another embodiment, the pressure in the cylinder is calculated based on the opening areas of the exhaust valves, and the internal combustion engine is controlled based on the pressure in the cylinder. Namely, the invention can be applied not only to the intake valves but also to the exhaust valves.

Described below is a third embodiment of the device for controlling an internal combustion engine according to the invention. The constitution of this embodiment is nearly the same as the constitution of the first embodiment illustrated in FIGS. 1 to 7. The temperature of gas in the cylinder varies as the valve-lifting amount of the intake valve 2, working angle and opening/closing timing (phase) are varied by the device 9 for changing the valve-lifting amount and by the opening/closing timing shifting device 11. If the ignition is conducted at a predetermined timing irrespective of a change in the temperature of gas in the cylinder, an optimum ignition timing is not accomplished, and the internal combustion engine is not suitably controlled. In order to conduct the ignition at an optimum timing and to suitably control the internal combustion engine, therefore, the temperature of gas in the cylinder must be correctly calculated depending upon changes in the valve-lifting amount of the intake valve 2, upon the working angle and upon the opening/closing timing (phase) thereof.

Figure 23:
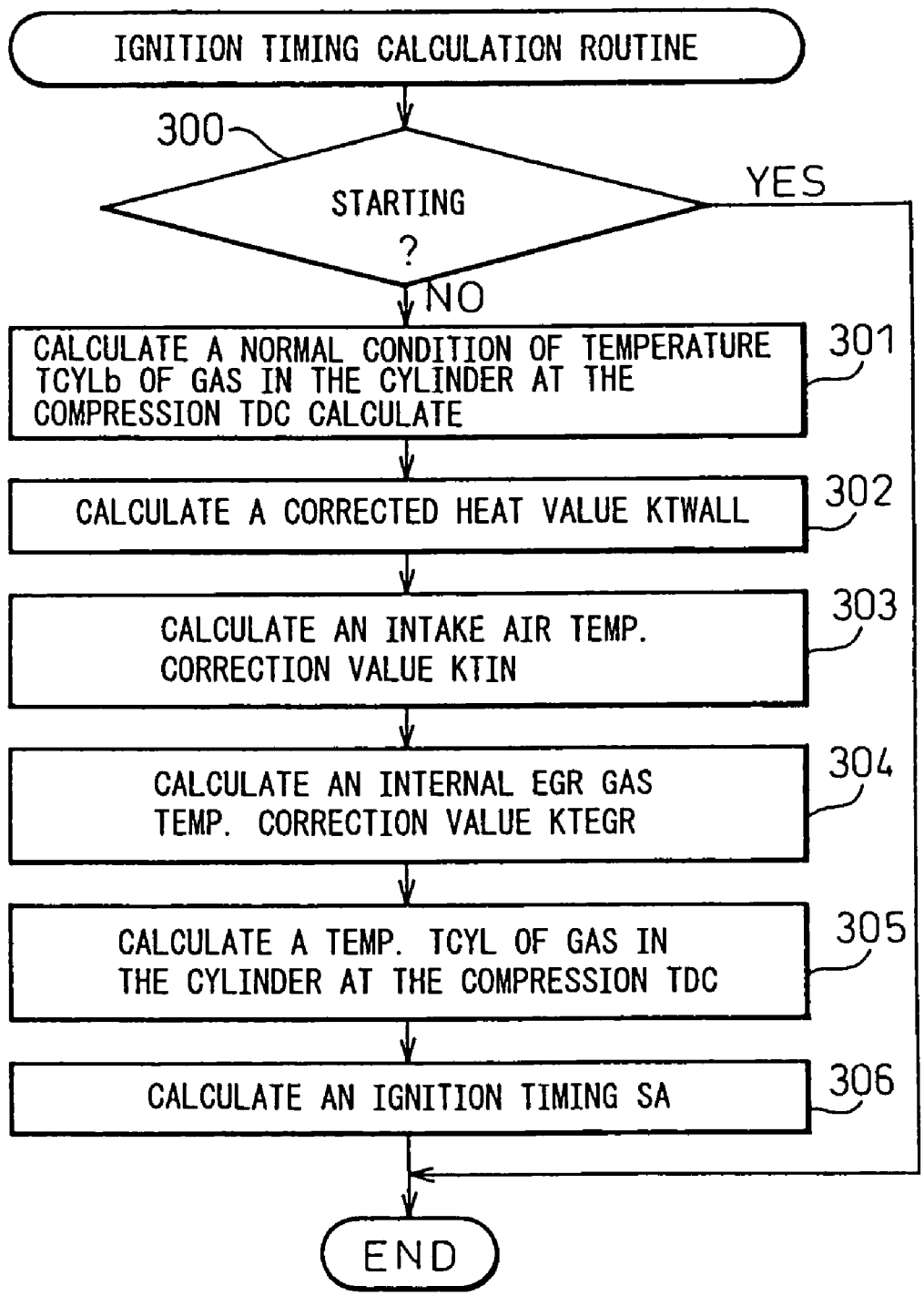
FIG. 23 is a flowchart illustrating a method of calculating the ignition timing according to a third embodiment.

FIG. 23 is a flowchart illustrating a method of calculating the ignition timing according to the embodiment. This routine is executed at predetermined time intervals. When the routine starts as shown in FIG. 23, it is first judged at step 300 if the engine is being started. When the result is YES, the temperature of gas in the cylinder is correctly calculated at the start of the engine where the amount of the fuel is being increased, it is so judged based thereupon that there is no need of determining the ignition timing, and the routine ends. When the result is NO, on the other hand, the routine proceeds to step 301. At step 301, the normal condition of temperature TCYLb of gas in the cylinder at the compression top dead center is calculated based on the valve-lifting amount LT of the intake valve 2, working angle VA, opening/closing timing VT, pressure PM in the intake pipe and the engine rotational speed NE.

Figure 24:
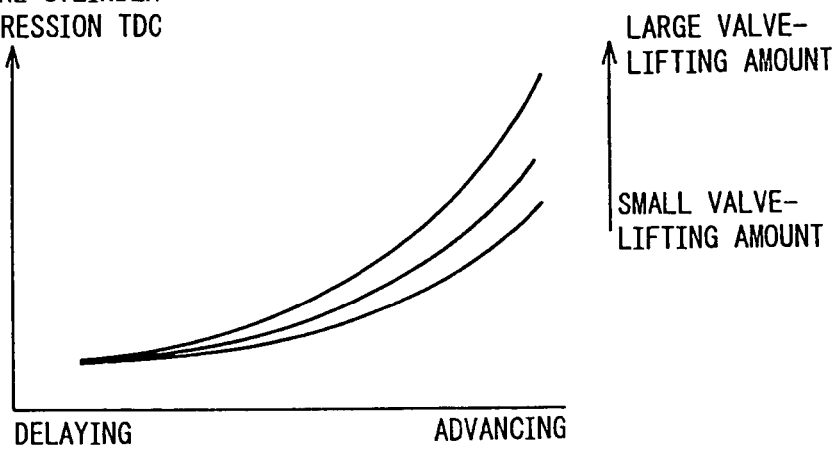
FIG. 24 is a diagram illustrating a relationship among the normal condition of temperature TCYLb of gas in the cylinder at the compression top dead center, the valve-lifting amount LT and the opening/closing timing (phase) VT.
Figure 25:
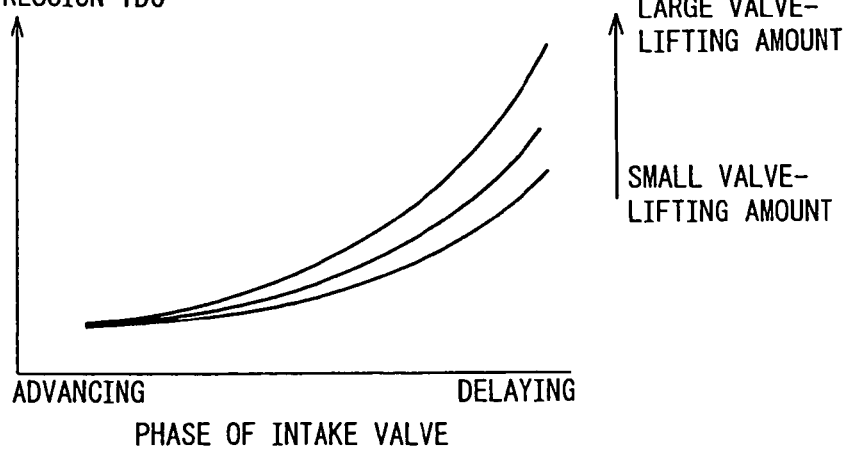
FIG. 25 is a diagram illustrating a relationship among the normal condition of temperature TCYLb of gas in the cylinder at the compression top dead center, the valve-lifting amount LT and the opening/closing timing (phase) VT.
Figure 26:
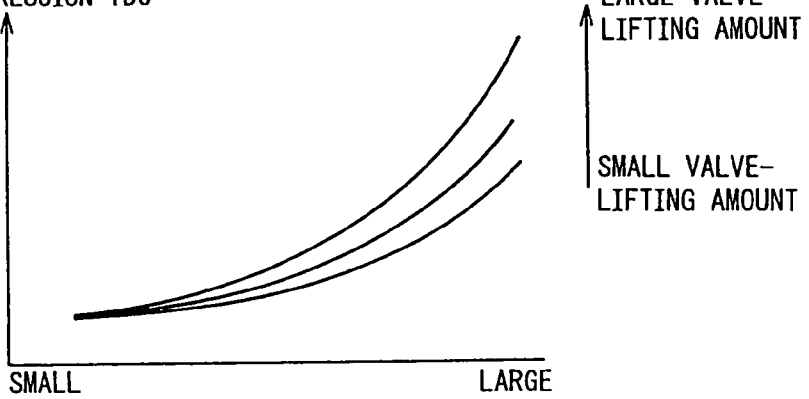
FIG. 26 is a diagram illustrating a relationship among the normal condition of temperature TCYLb of gas in the cylinder at the compression top dead center, the valve-lifting amount LT and the working angle VA.
Figure 27:
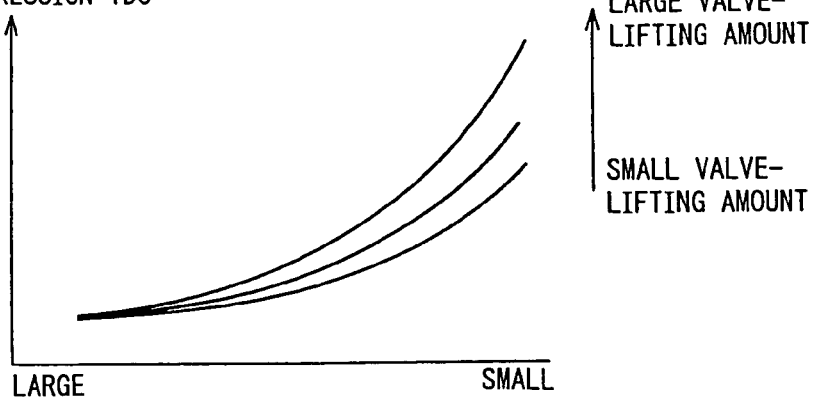
FIG. 27 is a diagram illustrating a relationship among the normal condition of temperature TCYLb of gas in the cylinder at the compression top dead center, the valve-lifting amount LT and the working angle VA.

FIG. 24 is a diagram illustrating a relationship among the normal condition of temperature TCYLb of gas in the cylinder at the compression top dead center, the valve-lifting amount LT and the opening/closing timing (phase) VT. As shown in FIG. 24, the normal condition of temperature TCYLb of gas in the cylinder at the compression top dead center calculated at step 301 increases with an increase in the valve-lifting amount LT, or increases as the opening/closing timing (phase) VT advances when the intake valve 2 is fully closed after the intake bottom dead center. As shown in FIG. 25, the normal condition of temperature TCYLb of gas in the cylinder at the compression top dead center calculated at step 301 increases with an increase in the valve-lifting amount LT, or increases as the opening/closing timing (phase) VT is delayed when the intake valve 2 is fully closed before the intake bottom dead center. FIG. 26 is a diagram illustrating a relationship among the normal condition of temperature TCYLb of gas in the cylinder at the compression top dead center, the valve-lifting amount LT and the working angle VA. As shown in FIG. 26, the normal condition of temperature TCYLb of gas in the cylinder at the compression top dead center calculated at step 301 increases with an increase in the working angle VA when the intake valve 2 is fully closed after the intake bottom dead center. FIG. 27 is a diagram illustrating a relationship among the normal condition of temperature TCYLb of gas in the cylinder at the compression top dead center, the valve-lifting amount LT and the working angle VA. As shown in FIG. 27, the normal condition of temperature TCYLb of gas in the cylinder at the compression top dead center calculated at step 301 increases with a decrease in the working angle VA when the intake valve 2 is fully closed before the intake bottom dead center.

Figure 28:
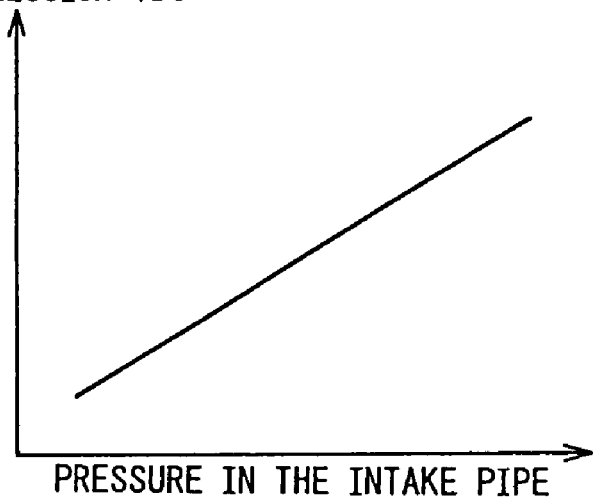
FIG. 28 is a diagram illustrating a relationship between the normal condition of temperature TCYLb of gas in the cylinder at the compression top dead center and the pressure PM in the intake pipe.
Figure 29:
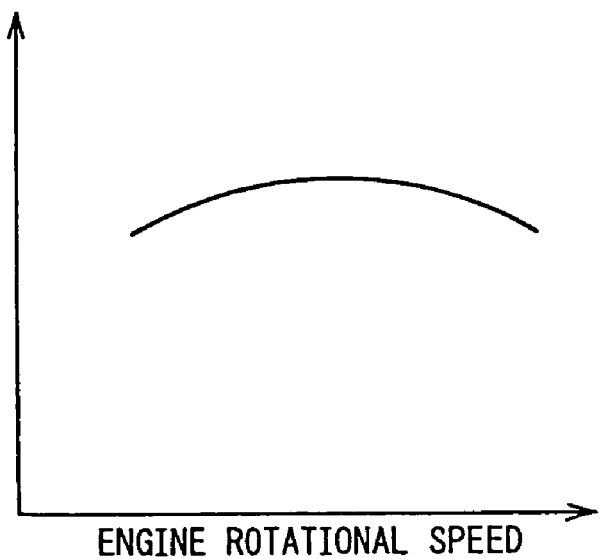
FIG. 29 is a diagram illustrating a relationship between the normal condition of temperature TCYLb of gas in the cylinder at the compression top dead center and the engine rotational speed NE.

FIG. 28 is a diagram illustrating a relationship between the normal condition of temperature TCYLb of gas in the cylinder at the compression top dead center and the pressure PM in the intake pipe. As shown in FIG. 28, the normal condition of temperature TCYLb of gas in the cylinder at the compression top dead center calculated at step 301 increases with an increase in the pressure PM in the intake pipe. As shown in FIG. 29, the normal condition of temperature TCYLb of gas in the cylinder at the compression top dead center calculated at step 301 becomes a peak when the engine rotational speed NE is an intermediate speed.

Reverting to the description of FIG. 23, a corrected heat value KTWALL is calculated at step 302 based on the cylinder wall temperature Twall. The cylinder wall temperature Twall is estimated in compliance with the following formula, $$Twall = (K1 \times Ga(i) - Tw(i) - Twall(i-1)) \times K2 + Twall(i)$$

where K1 is a combustion correction coefficient, K2 is a response coefficient, Ga is an intake air amount calculated based on the output of the air flow meter 19, Tw is the temperature of the engine cooling water, i is a value of when the routine shown in FIG. 23 is executed this time, and i−1 is a value of when the routine shown in FIG. 23 was executed in the previous time.

Figure 30:
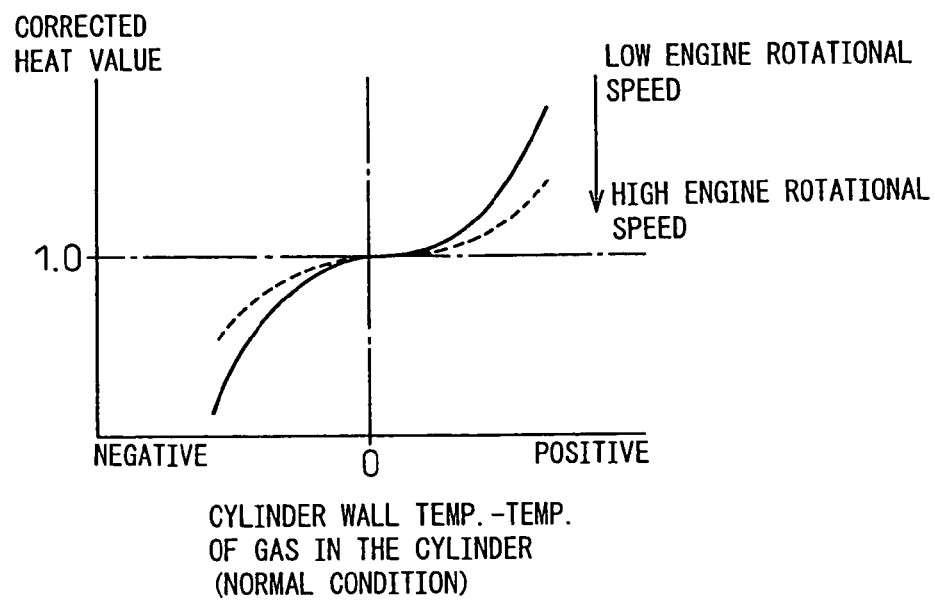
FIG. 30 is a diagram illustrating a relationship among the corrected heat value KTWALL, the difference between the cylinder wall temperature Twall and the normal condition of temperature TCYLb of gas in the cylinder at the compression top dead center, and the engine rotational speed NE.

The combustion correction coefficient K1 assumes a positive value when the fuel injected from the fuel injection valve 15 is burning to thereby cut the fuel, and assumes a negative value during the motoring in which no fuel is burning. FIG. 30 is a diagram illustrating a relationship among the corrected heat value KTWALL, the difference between the cylinder wall temperature Twall and the normal condition of temperature TCYLb of gas in the cylinder at the compression top dead center, and the engine rotational speed NE. As shown in FIG. 30, the corrected heat value KTWALL increases as the cylinder wall temperature Twall becomes higher than the normal condition of temperature TCYLb of gas in the cylinder at the compression top dead center, and increases as the engine rotational speed NE decreases.

Reverting to the description of FIG. 23, an intake air temperature correction value KTIN is calculated at step 303 based on the temperature of the intake air taken in by the cylinder.

Figure 31:
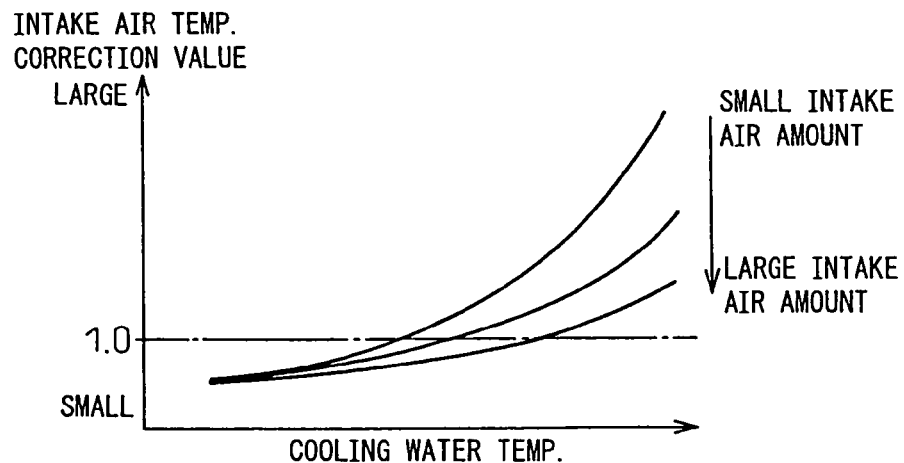
FIG. 31 is a diagram illustrating a relationship among the intake air temperature correction value KTIN, the engine cooling water temperature Tw, and the intake air amount Ga.

FIG. 31 is a diagram illustrating a relationship among the intake air temperature correction value KTIN, the engine cooling water temperature Tw and the intake air amount Ga. As shown in FIG. 31, the intake air temperature correction value KTIN increases with an increase in the engine cooling water temperature Tw, and increases with a decrease in the intake air amount Ga.

Figure 32:
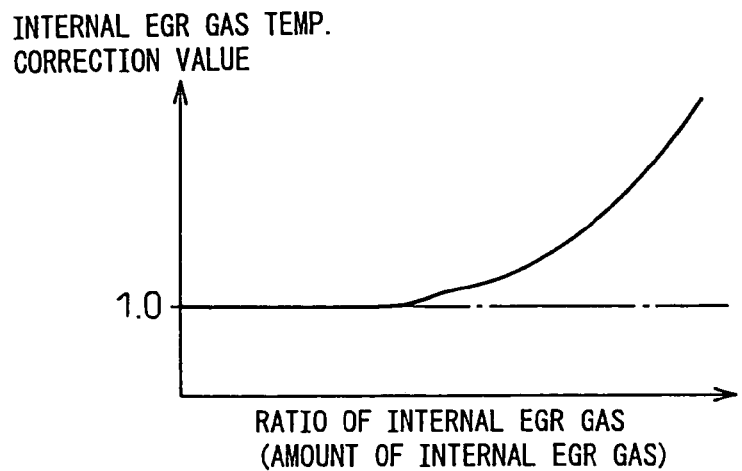
FIG. 32 is a diagram illustrating a relationship between the internal EGR gas temperature correction value KTEGR and the ratio of the internal EGR gas.
Figure 33:
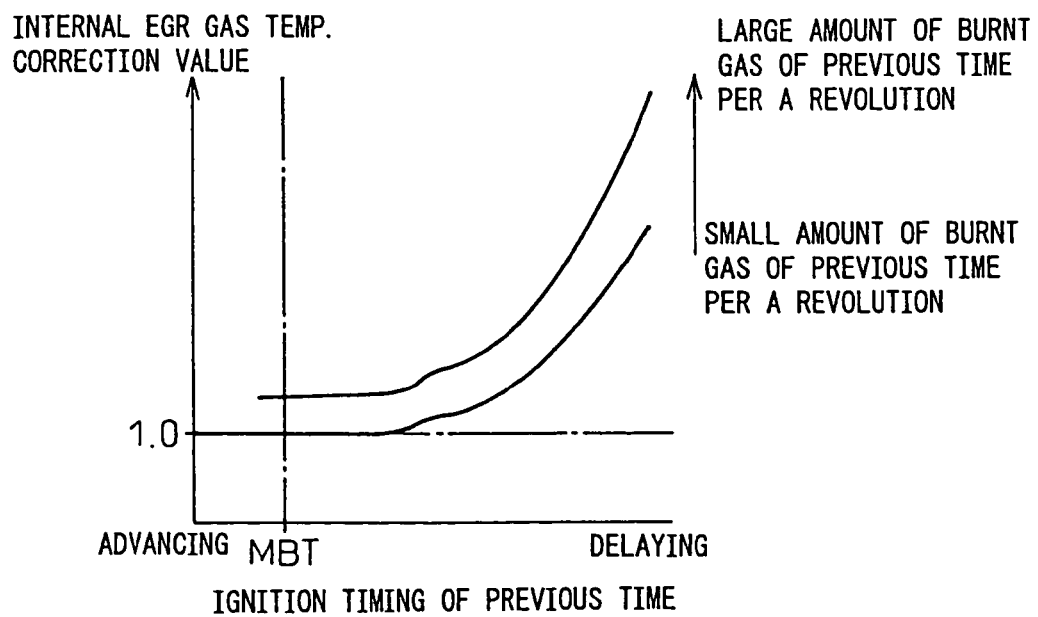
FIG. 33 is a diagram illustrating a relationship among the internal EGR gas temperature correction value KTEGR, the ignition timing of the previous time and the amount of gas burnt per one revolution of the previous time.
Figure 34:
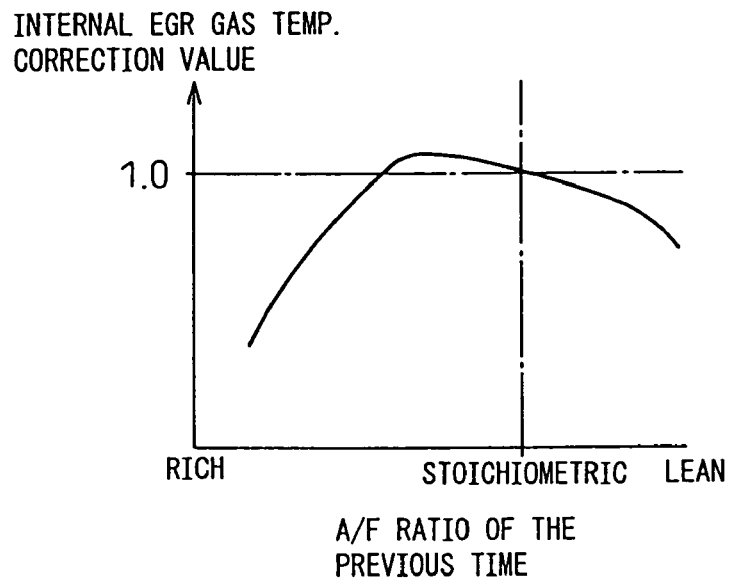
FIG. 34 is a diagram illustrating a relationship between the internal EGR gas temperature correction value KTEGR and the air-fuel ratio of the previous time.

Reverting to the description of FIG. 23, an internal EGR gas temperature correction value KTEGR is calculated at step 304 based on the ratio of the internal EGR gas in the cylinder. FIG. 32 is a diagram illustrating a relationship between the internal EGR gas temperature correction value KTEGR and the ratio of the internal EGR gas. As shown in FIG. 32, the internal EGR gas temperature correction value KTEGR increases with an increase in the ratio of the internal EGR gas. As a modified example of this embodiment, it is possible to calculate the internal EGR gas temperature correction value KTEGR based on the amount of the internal EGR gas. In this case, the internal EGR gas temperature correction value KTEGR increases with an increase in the amount of the internal EGR gas. As another modified example of this embodiment, it is allowable to calculate the internal EGR gas temperature correction value KTEGR based on the ignition timing of the previous time and the amount of the burnt gas per a revolution of the previous time. FIG. 33 is a diagram illustrating a relationship among the internal EGR gas temperature correction value KTEGR, the ignition timing of the previous time and the amount of burnt gas per a revolution of the previous time. As shown in FIG. 33, the internal EGR gas temperature correction value KTEGR increases as the ignition timing of the previous time is delayed, and increases with an increase in the amount of burnt gas per a revolution of the previous time. As a further modified example of this embodiment, it is possible to calculate the internal EGR gas temperature correction value KTEGR based on the air-fuel ratio of the previous time. FIG. 34 is a diagram illustrating a relationship between the internal EGR gas temperature correction value KTEGR and the air-fuel ratio of the previous time. As shown in FIG. 34, the internal EGR gas temperature correction value KTEGR becomes a peak at an air-fuel ratio which is slightly richer than the stoichiometric ratio, and decreases toward either the rich side or the lean side.

Figure 35:
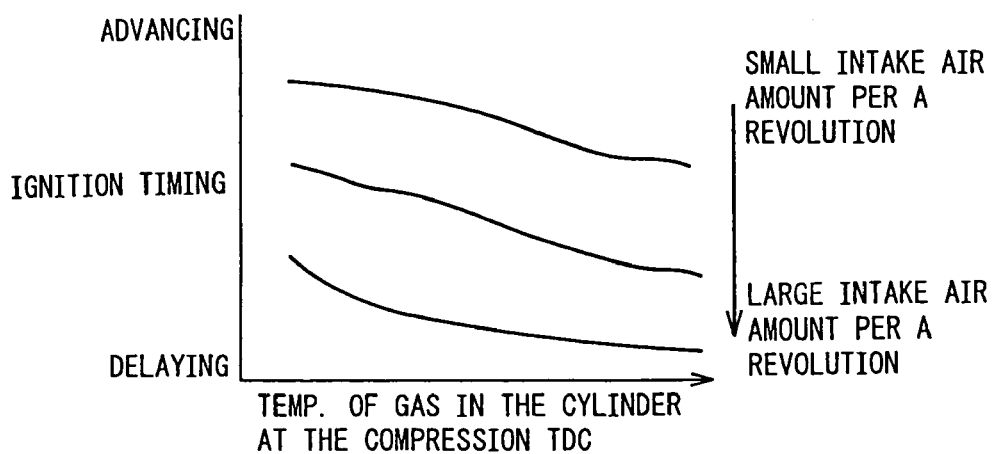
FIG. 35 is a diagram illustrating a relationship among the ignition timing SA, the temperature TCYL of gas in the cylinder at the compression top dead center and the intake air amount GN per a revolution.

Reverting to the description of FIG. 23, a temperature TCYL of gas in the cylinder at the compression top dead center (TCYL←TCYLb×KTWALL×KTIN×KTEGR) is calculated at step 305 based upon the normal condition of temperature TCYLb of gas in the cylinder at the compression top dead center calculated at step 301, corrected heat value KTWALL calculated at step 302, intake air temperature correction value KTIN calculated at step 303 and internal EGR gas temperature correction value KTEGR calculated at step 304. Then, at step 306, an ignition timing SA is calculated based upon the gas temperature TCYL at the compression top dead center, intake air amount GN per one revolution and engine rotational speed NE. FIG. 35 is a diagram illustrating a relationship among the ignition timing SA, the temperature TCYL of gas in the cylinder at the compression top dead center and the intake air amount GN per a revolution. As shown in FIG. 35, the ignition timing SA calculated at step 306 is delayed as the temperature TCYL of gas in the cylinder at the compression top dead center becomes high, and is delayed as the intake air amount GN increases per a revolution. As shown in FIG. 16, further, the ignition timing SA calculated at step 306 advances as the engine rotational speed NE increases.

In this embodiment as described above, the temperature of gas in the cylinder (temperature TCYL of gas in the cylinder at the compression top dead center) is calculated at steps 301 and 305 in FIG. 23 based upon the opening area of the intake valve 2 that varies depending upon the valve-lifting amount LT which is changed by the device 9 for changing the valve-lifting amount, which is the variable valve mechanism, and the internal combustion engine is controlled based upon the temperature of gas in the cylinder. According to this embodiment, therefore, it is possible to more suitably control the internal combustion engine than when the internal combustion engine is controlled based upon the temperature of the cylinder wall, that is done by the device for controlling internal combustion engines taught in Japanese Unexamined Patent Publication (Kokai) No. 4-81574. The internal combustion engine can be suitably controlled even when the opening area of the intake valve 2 is varied. More specifically, the temperature of gas in the cylinder calculated based on the opening area of the intake valve increases with an increase in the opening area of the intake valve 2 as shown in FIGS. 24 and 25, and the internal combustion engine is so controlled that the ignition timing SA is delayed as the temperature of gas in the cylinder increases as shown in FIG. 35.

In this embodiment, further, the temperature of gas in the cylinder (temperature TCYL of gas in the cylinder at the compression top dead center) is calculated at steps 301 and 305 in FIG. 23 based on the working angle VA of the intake valve 2 that is varied by the device 9 for changing the valve-lifting amount, which is the variable valve mechanism, and the internal combustion engine is controlled based on the temperature of gas in the cylinder. According to this embodiment, therefore, it is possible to more suitably control the internal combustion engine than when the internal combustion engine is controlled based upon the temperature of the cylinder wall, which is done by the device for controlling internal combustion engines taught in Japanese Unexamined Patent Publication (Kokai) No. 4-81574. The internal combustion engine can be suitably controlled even when the working angle VA of the intake valve 2 is varied. More specifically, when the intake valve 2 is fully closed after the suction bottom dead center as shown in FIG. 26, the temperature of gas in the cylinder calculated based on the working angle VA of the intake valve 2 increases with an increase in the working angle VA of the intake valve 2, and the internal combustion engine is so controlled that the ignition timing SA is delayed as the temperature of gas in the cylinder increases as shown in FIG. 35. Further, when the intake valve 2 is fully closed before the suction bottom dead center as shown in FIG. 27, the temperature of gas in the cylinder calculated based on the working angle VA of the intake valve 2 increases with a decrease in the working angle VA of the intake valve 2, and the internal combustion engine is so controlled that the ignition timing SA is delayed as the temperature of gas in the cylinder increases as shown in FIG. 35.

In this embodiment, further, the temperature of gas in the cylinder (temperature TCYL of gas in the cylinder at the compression top dead center) is calculated at steps 301 and 305 in FIG. 23 based on both the opening area and the working angle VA of the intake valve 2 that are varied by the device 9 for changing the valve-lifting amount, which is the variable valve mechanism, and the internal combustion engine is controlled based on the temperature of gas in the cylinder. According to this embodiment, therefore, it is possible to more suitably control the internal combustion engine by correctly calculating the temperature of gas in the cylinder than when the temperature of gas in the cylinder is calculated based only upon the opening area of the intake valve 2 but not upon the working angle VA of the intake valve 2 or than when the temperature of gas in the cylinder is calculated based only upon the working angle VA of the intake valve 2 but not upon the opening area of the intake valve 2.

In this embodiment, further, the temperature of gas in the cylinder (temperature TCYL of gas in the cylinder at the compression top dead center) is calculated at steps 301 and 305 in FIG. 23 based upon the opening/closing timing (phase) VT of the intake valve 2, pressure PM in the intake pipe and the engine rotational speed NE, and the internal combustion engine is controlled based on the temperature of gas in the cylinder. According to this embodiment, therefore, it is possible to suitably control the internal combustion engine by more correctly calculating the temperature of gas in the cylinder than when the temperature of gas in the cylinder is not calculated based the opening/closing timing (phase) VT of the intake valve 2, pressure PM in the intake pipe, and engine rotational speed NE.

In this embodiment, further, the temperature of gas in the cylinder is corrected at step 302 in FIG. 23 based on the cylinder wall temperature Twall and the engine rotational speed NE, the temperature of gas in the cylinder is corrected at step 303 based on the intake air amount Ga, and the temperature of gas in the cylinder is corrected at step 304 based on the amount of the internal EGR gas (ratio of the internal EGR gas), i.e., based on the temperature of the internal EGR gas that varies being affected thereby. According to this embodiment, therefore, it is possible to more suitably control the internal combustion engine than when the temperature of gas in the cylinder is not corrected based thereupon.

In this embodiment, the temperature of gas in the cylinder is calculated based on the opening area and the like of the intake valve, and the internal combustion engine is controlled based on the temperature of gas in the cylinder. In another embodiment, it is also possible to calculate the temperature of gas in the cylinder based on the opening area and the like of the exhaust valve, and to control the internal combustion engine based on the temperature of gas in the cylinder. Namely, this invention can be applied not only to the intake valves but also to the exhaust valves.

Described below is a fourth embodiment of the device for controlling an internal combustion engine according to the invention. The constitution of this embodiment is nearly the same as the constitution of the first embodiment illustrated in FIGS. 1 to 7. The ratio of the internal EGR gas in the cylinder varies as the valve-lifting amount of the intake valve 2, working angle and opening/closing timing (phase) are varied by the device 9 for changing the valve-lifting amount and by the opening/closing timing shifting device 11. If the ignition is conducted at a predetermined timing irrespective of a change in the ratio of the internal EGR gas, an optimum ignition timing is not accomplished, and the internal combustion engine is not suitably controlled. In order to conduct the ignition at an optimum timing and to suitably control the internal combustion engine, therefore, the ratio of the internal EGR gas must be correctly calculated depending upon changes in the valve-lifting amount of the intake valve 2, working angle and opening/closing timing (phase) thereof.

Figure 36:
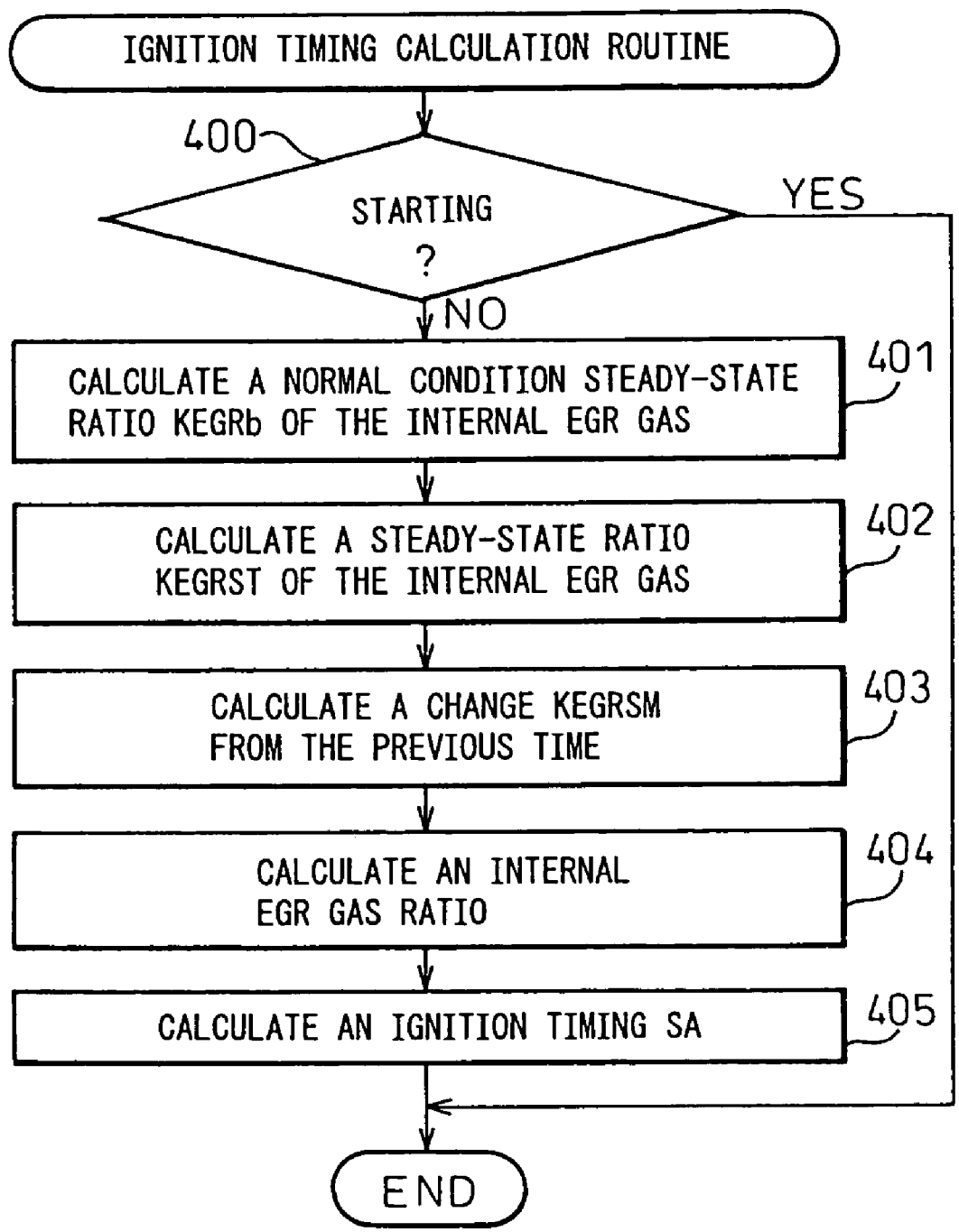
FIG. 36 is a flowchart illustrating a method of calculating the ignition timing according to a fourth embodiment.

FIG. 36 is a flowchart illustrating a method of calculating the ignition timing according to the embodiment. This routine is executed at predetermined time intervals. When the routine starts as shown in FIG. 36, it is, first, judged at step 400 if the engine is being started. When the result is YES, a ratio of the internal EGR gas is correctly calculated at the starting of the engine, where the amount of the fuel is increased, it is so judged based thereupon that there is no need to determine the ignition timing, and the routine ends. When the result is NO, on the other hand, the routine proceeds to step 401. At step 401, the normal condition steady-state ratio KEGRb of the internal EGR gas is calculated based on the valve-lifting amount LT of the intake valve 2, working angle VA, opening/closing timing VT, pressure PM in the intake pipe and the engine rotational speed NE.

Figure 37:
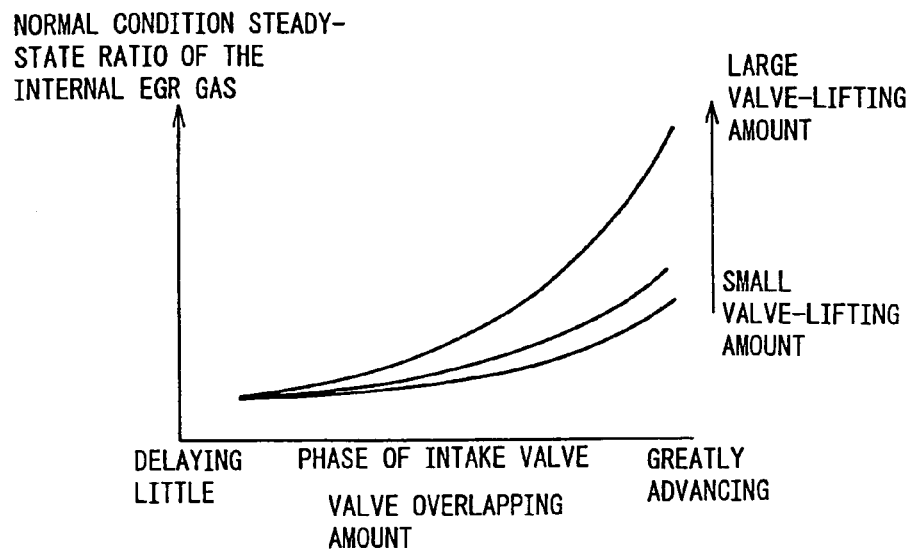
FIG. 37 is a diagram illustrating a relationship among the normal condition steady-state ratio KEGRb of the internal EGR gas, the valve-lifting amount LT and the opening/closing timing (phase) VT.
Figure 38:
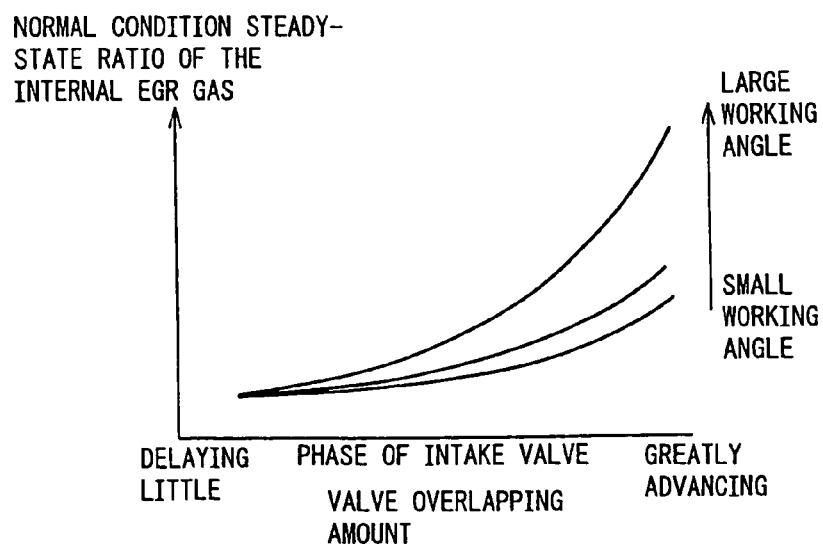
FIG. 38 is a diagram illustrating a relationship among the normal condition steady-state ratio KEGRb of the internal EGR gas ratio, the working angle VA and the opening/closing timing (phase) VT.

FIG. 37 is a diagram illustrating a relationship among the normal condition steady-state ratio KEGRb of the internal EGR gas, the valve-lifting amount LT and the opening/closing timing (phase) VT. As shown in FIG. 37, the normal condition steady-state ratio KEGRb of the internal EGR gas calculated at step 401 increases with an increase in the valve-lifting amount LT, or increases as the opening/closing timing (phase) VT advances. FIG. 38 is a diagram illustrating a relationship among the normal condition steady-state ratio KEGRb of the internal EGR gas, the working angle VA and the opening/closing timing (phase) VT. As shown in FIG. 38, the normal condition steady-state ratio KEGRb of the internal EGR gas calculated at step 401 increases with an increase in the valve-lifting amount VA.

Figure 39:
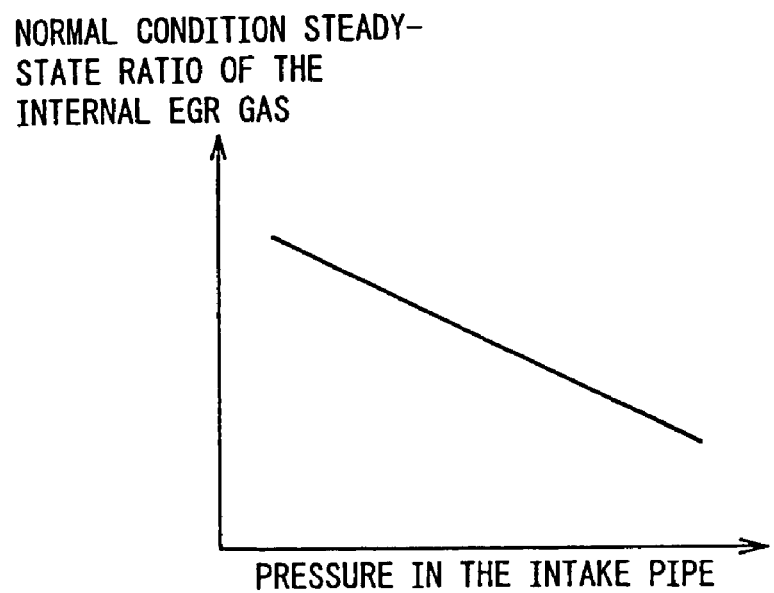
FIG. 39 is a diagram illustrating a relationship between the normal condition steady-state ratio KEGRb of the internal EGR gas ratio and the pressure PM in the intake pipe.
Figure 40:
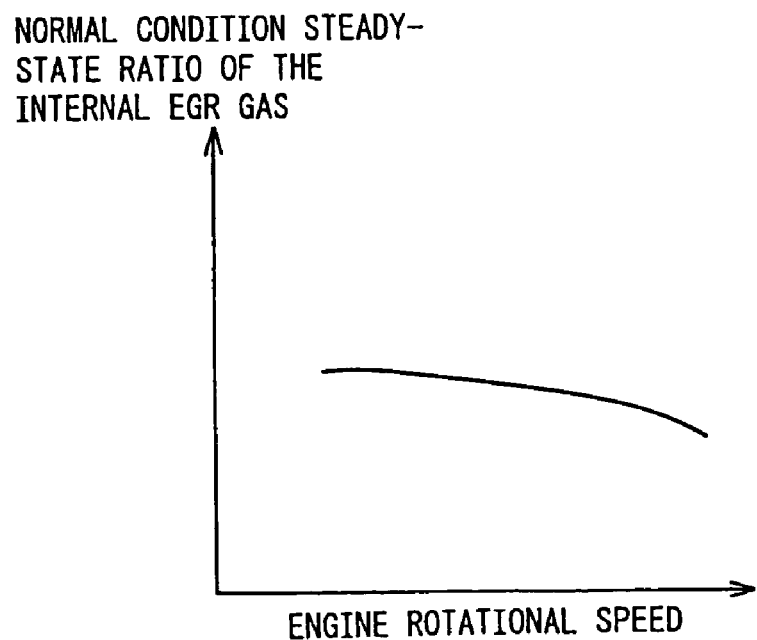
FIG. 40 is a diagram illustrating a relationship between the normal condition steady-state ratio KEGRb of the internal EGR gas ratio and the engine rotational speed NE.

FIG. 39 is a diagram illustrating a relationship between the normal condition steady-state ratio KEGRb of the internal EGR gas and the pressure PM in the intake pipe. As shown in FIG. 39, the normal condition steady-state ratio KEGRb of the internal EGR gas calculated at step 401 decreases with an increase in pressure PM in the intake pipe. As shown in FIG. 40, the normal condition steady-state ratio KEGRb of the internal EGR gas calculated at step 401 decreases with an increase in the engine rotational speed NE.

Figure 41:
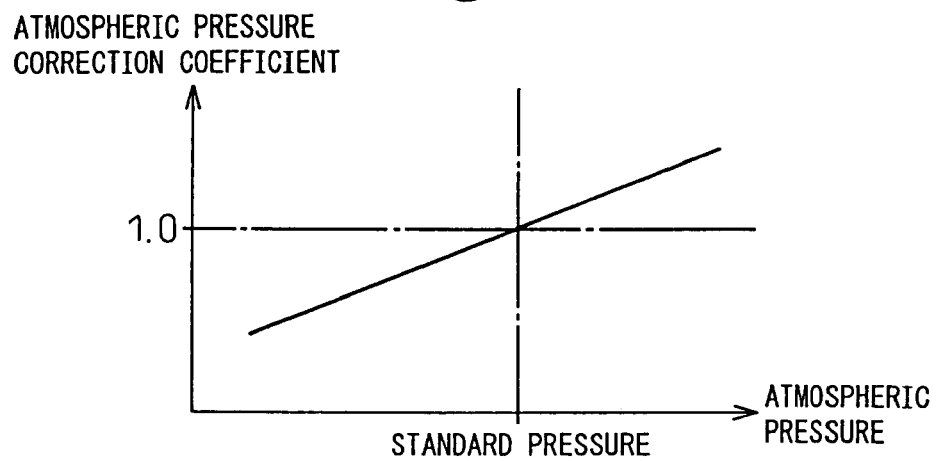
FIG. 41 is a diagram illustrating a relationship between the atmospheric pressure correction coefficient KPA and the atmospheric pressure.
Figure 42:
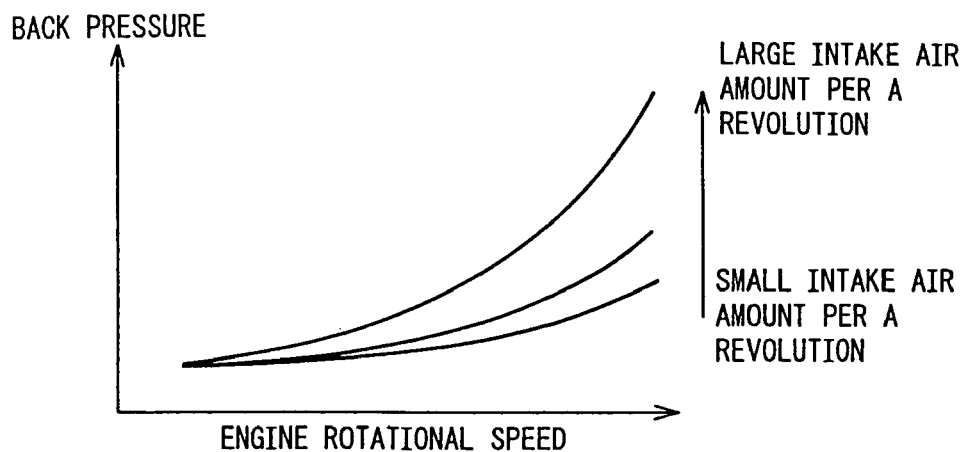
FIG. 42 is a diagram illustrating a relationship among the back pressure, the engine rotational speed NE and the intake air amount GN per one revolution.
Figure 43:
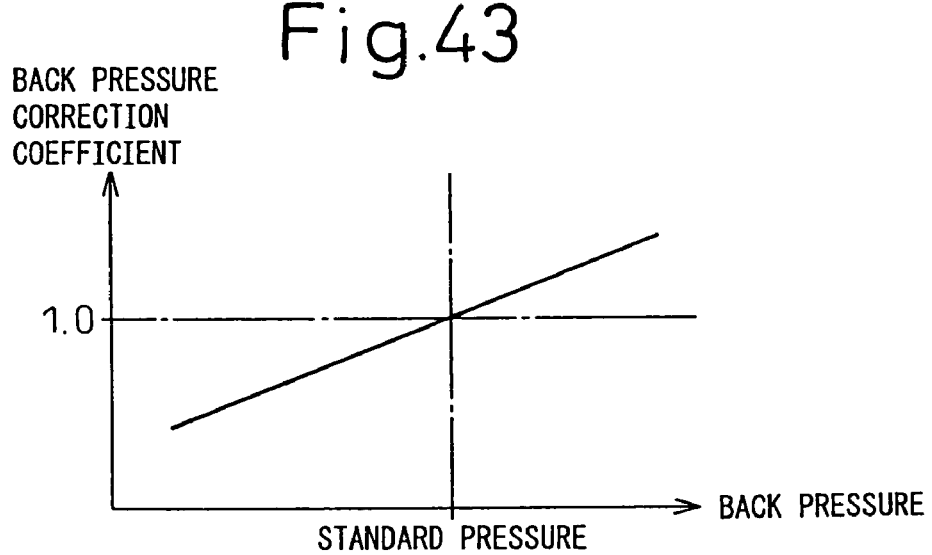
FIG. 43 is a diagram illustrating a relationship between the back pressure and the back pressure correction coefficient for correcting the internal EGR gas ratio.

Reverting to the description of FIG. 36, a steady-state ratio KEGRST of the internal EGR gas is calculated (KEGRST←KEGRb×KPA) at step 402 based on the normal condition steady-state ratio KEGRb of the internal EGR gas and the atmospheric pressure correction coefficient KPA. Namely, the correction is effected by taking into consideration the atmospheric pressure having a large ratio of the internal EGR gas. FIG. 41 is a diagram illustrating a relationship between the atmospheric pressure correction coefficient KPA and the atmospheric pressure. As shown in FIG. 41, the atmospheric pressure correction coefficient KPA increases with an increase in the atmospheric pressure. Namely, the ratio of the internal EGR gas increases with an increase in the atmospheric pressure. In a modified example of this embodiment, it is also possible to calculate the correction coefficient based on the back pressure instead of calculating the correction coefficient KPA based on the atmospheric pressure illustrated in FIG. 41, and to correct the ratio of the internal EGR gas based on the correction coefficient. FIG. 42 is a diagram illustrating a relationship among the back pressure, the engine rotational speed NE and the intake air amount GN per a revolution. As shown in FIG. 42, the back pressure increases with an increase in the engine rotational speed NE, or increases with an increase in the intake air amount GN per a revolution. FIG. 43 is a diagram illustrating a relationship between the back pressure correction coefficient and the back pressure for correcting the ratio of the internal EGR gas. As shown in FIG. 43, the back pressure correction coefficient increases with an increase in the back pressure. Namely, the ratio of the internal EGR gas increases with an increase in the back pressure.

Figure 44:
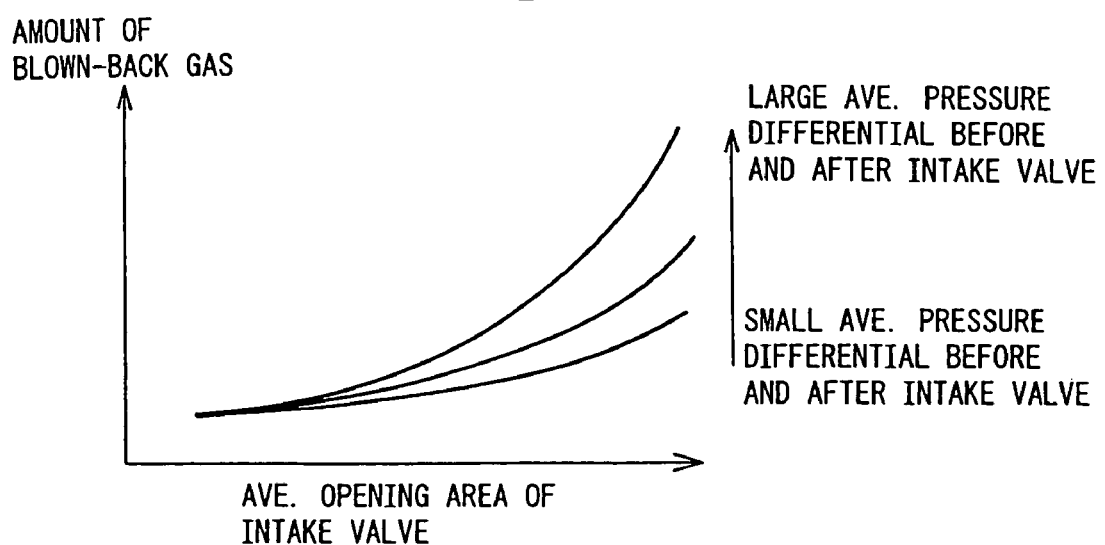
FIG. 44 is a diagram illustrating a relationship among the amount of the blown-back gas, the average opening area of the intake valve 2 (average opening area of the intake valve during the valve overlapping period) and the average pressure differential before and after the intake valve 2 (average differential between the pressure in the cylinder and the pressure in the intake pipe during the valve overlapping period)
Figure 45:
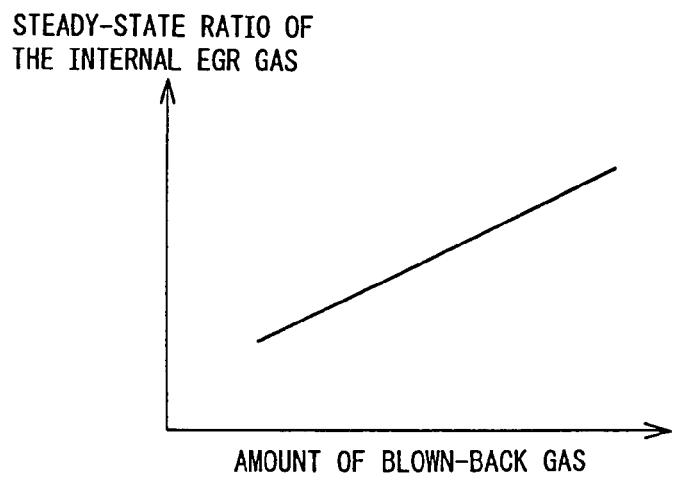
FIG. 45 is a diagram illustrating a relationship between the amount of the blown-back gas and the steady-state ratio KEGRST of the internal EGR gas.

In a modified example of the embodiment, further, the steady-state ratio KEGRST of the internal EGR gas can be corrected at step that is not illustrated which is next of step 402 of FIG. 36 based upon the amount of the burnt gas (hereinafter referred to as "amount of blown-back gas") that is taken in again by the cylinder after being blown back into the intake pipe. FIG. 44 is a diagram illustrating a relationship among the amount of the blown-back gas, the average opening area of the intake valve 2 (average opening area of the intake valve during the valve overlapping period) and the average pressure differential before and after the intake valve 2 (average differential between the pressure in the cylinder and the pressure in the intake pipe during the valve overlapping period). As shown in FIG. 44, the amount of the blown-back gas increases with an increase in the opening area of the intake valve 2, and increases with an increase in the pressure differential before and after the intake valve, i.e., increases as the pressure in the cylinder becomes greater than the pressure in the intake pipe. FIG. 45 is a diagram illustrating a relationship between the steady-state ratio KEGRST of the internal EGR gas and the amount of the blown-back gas. As shown in FIG. 45, the steady-state ratio KEGRST of the internal EGR gas increases with an increase in the amount of the blown-back gas. Namely, the steady-state ratio KEGRST of the internal EGR gas increases with an increase in the opening area of the intake valve 2 or increases as the pressure in the cylinder becomes greater than the pressure in the intake pipe. According to this modified example, the ratio of the internal EGR gas is calculated based upon the opening area of the intake valve 2 during the valve overlapping period varied by the variable valve mechanism, upon the pressure (pressure in the cylinder) on the downstream side of the intake valve 2 during the valve overlapping period and upon the pressure (pressure in the intake pipe) on the upstream side, and the internal combustion engine is controlled based on the ratio of the internal EGR gas. Therefore, the internal combustion engine can be suitably controlled by more correctly calculating the ratio of the internal EGR gas than when the ratio of the internal EGR gas is calculated based only upon the opening area of the intake valve varied by the variable valve mechanism or than when the ratio of the internal EGR gas is not calculated based on the pressure downstream of the intake valve during the valve overlapping period or on the pressure on the upstream side.

According to a further modified example, it is allowable to calculate the instantaneous ratio of the internal EGR gas based upon the opening area at regular intervals during the valve overlapping period and upon a difference between the pressure in the cylinder (pressure downstream of the intake valve 2) during the valve overlapping period and the pressure in the intake pipe (pressure upstream of the intake valve 2) at regular intervals, instead of relying upon the opening area of the intake valve during the valve overlapping period and the average differential between the pressure in the cylinder and the pressure in the intake pipe during the valve overlapping period, in order to control the internal combustion engine based on the ratio of the internal EGR gas obtained by integrating the instantaneous ratios of the internal EGR gas. According to this modified example, it is allowed to suitably control the internal combustion engine by correctly calculating the ratio of the internal EGR gas even when there are great variations in the opening area of the intake valve 2 during the valve overlapping period or in the pressure upstream of the intake valve during the valve overlapping period or in the pressure downstream thereof.

Figure 46:
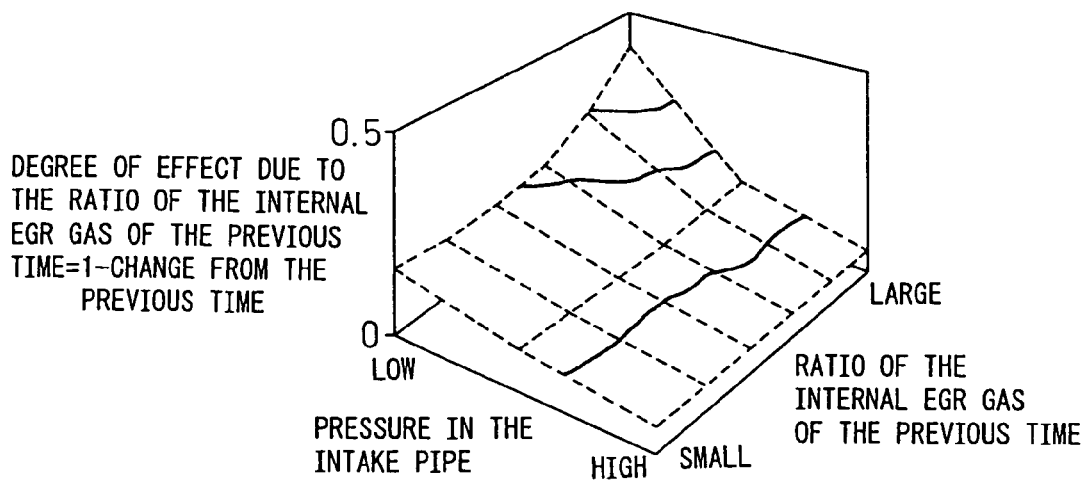
FIG. 46 is a diagram illustrating a relationship among the degree of effect due to the internal EGR gas of the previous time (=1−ratio of change KEGRSM from the previous time), the ratio KEGRO of the internal EGR gas in the previous time and the pressure PM in the intake pipe.

Reverting to the description of FIG. 36, a change KEGRSM from the previous time is calculated at step 403 based on the ratio KEGRO of the internal EGR gas of the previous time and the pressure PM in the intake pipe. FIG. 46 is a diagram illustrating a relationship among the degree of effect (=1−change KEGRSM from the previous time) due to the ratio of the internal EGR gas of the previous time, the ratio KEGRO of the internal EGR gas of the previous time and the pressure PM in the intake pipe. As shown in FIG. 46, the degree of effect due to the ratio of the internal EGR gas of the previous time decreases with a decrease in the ratio KEGRO of the internal EGR gas of the previous time, and decreases with an increase in the pressure PM in the intake pipe. Namely, the change KEGRSM from the previous time increases with a decrease in the ratio KEGRO of the internal EGR gas of the previous time and increases with an increase in the pressure PM in the intake pipe.

Figure 47:
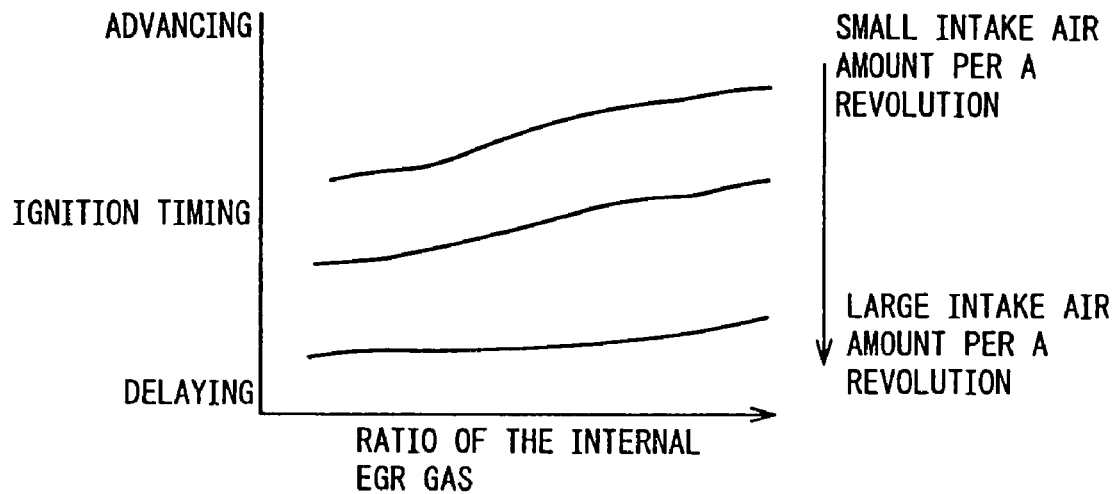
FIG. 47 is a diagram illustrating a relationship among the ignition timing SA, the ratio KEGR of the internal EGR gas and the intake air amount GN per a revolution.
Figure 48:
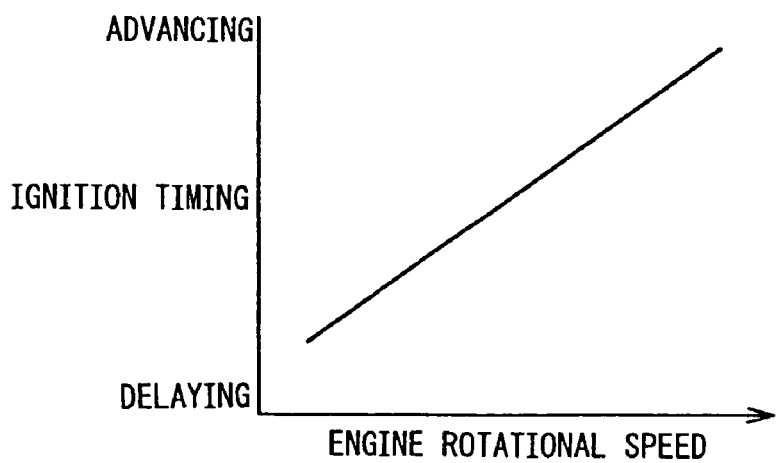
FIG. 48 is a diagram illustrating a relationship between the ignition timing SA and the engine rotational speed NE.

Reverting to the description of FIG. 36, a ratio KEGR of the internal EGR gas is calculated (KEGR←(KEGRST−KEGRO)×KEGRSM+KEGRO) at step 404 based on the steady-state ratio KEGRST of the internal EGR gas, ratio KEGRO of the internal EGR gas of the previous time (=ratio KEGR of the internal EGR gas calculated at step 404 when the routine was executed in the previous time) and change KEGRSM from the previous time. Then, at step 405, an ignition timing SA is calculated based on the ratio KEGR of the internal EGR gas, intake air amount GN per a revolution and engine rotational speed NE. As shown in FIG. 47, the ignition timing SA calculated at step 405 advances with an increase in the ratio KEGR of the internal EGR gas, and advances with a decrease in the intake air amount N per one revolution. FIG. 48 is a diagram illustrating a relationship between the ignition timing SA and the engine rotational speed NE. As shown in FIG. 48, the ignition timing SA calculated at step 405 advances as the engine rotational speed NE increases.

In this embodiment as described above, the ratio of the internal EGR gas is calculated at steps 401 and 404 of FIG. 36 based upon the opening area of the intake valve 2 that is varied depending upon the valve-lifting amount LT which is changed by the device 9 for changing the valve-lifting amount, which is the variable valve mechanism, and the internal combustion engine is controlled based on the ratio of the internal EGR gas. According to this embodiment, therefore, it is possible to suitably control the internal combustion engine by more correctly calculating the ratio of the internal EGR gas than when the ratio of the internal EGR gas is calculated without considering a change in the opening area of the intake valve 2 by the variable valve mechanism, which is done by the device for controlling internal combustion engines taught in Japanese Unexamined Patent Publication (Kokai) No. 9-209895. Namely the internal combustion engine can be suitably controlled by correctly calculating the ratio of the internal EGR gas even when the opening area of the intake valve 2 is varied. More specifically, the ratio of the internal EGR gas calculated based on the opening area of the intake valve increases with an increase in the opening area of the intake valve 2 as shown in FIG. 37, and the internal combustion engine is so controlled that the ignition timing SA advances as the ratio of the internal EGR gas increases as shown in FIG. 47.

In this embodiment, further, the ratio of the internal EGR gas is calculated at steps 401 and 404 of FIG. 36 based upon the working angle VA of the intake valve 2 that is varied by the device 9 for changing the valve-lifting amount, which is the variable valve mechanism, and the internal combustion engine is controlled based on the ratio of the internal EGR gas. According to this embodiment, therefore, it is possible to suitably control the internal combustion engine by more correctly calculating the ratio of the internal EGR gas than when the ratio of the internal EGR gas is calculated without considering a change in the working angle VA of the intake valve 2 due to the variable valve mechanism, which is done by the device for controlling internal combustion engines taught in Japanese Unexamined Patent Publication (Kokai) No. 9-209895. Namely, the internal combustion engine can be suitably controlled by correctly calculating the ratio of the internal EGR gas even when the working angle VA of the intake valve 2 is varied. More specifically, the ratio of the internal EGR gas calculated based on the opening area of the intake valve increases with an increase in the working angle VA of the intake valve 2 as shown in FIG. 38, and the internal combustion engine is so controlled that the ignition timing SA advances as the ratio of the internal EGR gas increases as shown in FIG. 47.

In this embodiment, further, the ratio of the internal EGR gas is calculated at steps 401 and 404 of FIG. 36 based upon both the opening area and the working angle VA of the intake valve 2 that are varied by the device 9 for changing the valve-lifting amount, which is the variable valve mechanism, and the internal combustion engine is controlled based on the ratio of the internal EGR gas. According to this embodiment, therefore, it is possible to suitably control the internal combustion engine by more correctly calculating the ratio of the internal EGR gas than when the ratio of the internal EGR gas is calculated based only upon the opening area of the intake valve 2 but not upon the working angle VA of the intake valve 2 or than when the ratio of the internal EGR gas is calculated based only upon the working angle VA of the intake valve 2 but not upon the opening area of the intake valve 2.

In this embodiment, further, the ratio of the internal EGR gas is calculated at steps 401 and 404 of FIG. 36 based upon the opening/closing timing (phase) VT of the intake valve 2, pressure PM in the intake pipe and engine rotational speed NE, and the internal combustion engine is controlled based on the ratio of the internal EGR gas. According to this embodiment, therefore, it is possible to suitably control the internal combustion engine by more correctly calculating the ratio of the internal EGR gas than when the ratio of the internal EGR gas is not calculated based on the opening/closing timing (phase) VT of the intake valve 2, pressure PM in the intake pipe and engine rotational speed NE.

In this embodiment, further, the ratio of the internal EGR gas is corrected at step 402 of FIG. 36 based on the atmospheric pressure. In the modified example at step 402, the ratio of the internal EGR gas is corrected based on the pressure in the exhaust pipe, i.e., based on the back pressure, and is further corrected at step 404 based on the ratio KEGRO of the internal EGR gas calculated by the routine in the previous time. According to this embodiment, therefore, it is possible to more suitably control the internal combustion engine than when the ratio of the internal EGR gas is not corrected based thereupon.

In the above-mentioned embodiment and the modified example, the ratio of the internal EGR gas is calculated and the internal combustion engine is controlled based thereupon. In place of this, however, it is also possible to calculate the amount of the internal EGR gas based on the same methods as those described above and to control the internal combustion engine based thereupon. Namely, the tendencies of inclination of the curves in the above-mentioned diagrams are the same between when there is used the ratio of the internal EGR gas and when there is used the amount of the EGR gas.

In the above embodiment and the modified example, the ratio or amount of the internal EGR gas is calculated based on the opening area of the intake valve, and the internal combustion engine is controlled based on the ratio or amount of the internal EGR gas. In another embodiment, however, it is also possible to calculate the ratio or amount of the internal EGR gas based on the opening area of the exhaust valve and to control the internal combustion engine based on the ratio or amount of the internal EGR gas. Namely, the invention can be applied not only to the intake valves but also to the exhaust valves.

Described below is a fifth embodiment of the device for controlling an internal combustion engine according to the invention. The constitution of this embodiment is nearly the same as the constitution of the first embodiment illustrated in FIGS. 1 to 7. The degree of turbulence in the cylinder varies as the valve-lifting amount of the intake valve 2, working angle and opening/closing timing (phase) are varied by the device 9 for changing the valve-lifting amount and by the opening/closing timing shifting device 11. If the ignition is conducted at a predetermined timing irrespective of a change in the degree of turbulence in the cylinder, an optimum ignition timing is not accomplished, and the internal combustion engine is not suitably controlled. In order to conduct the ignition at an optimum timing and to suitably control the internal combustion engine, therefore, the degree of turbulence in the cylinder must be correctly calculated depending upon changes in the valve-lifting amount of the intake valve 2, working angle and opening/closing timing (phase) thereof.

Figure 49:
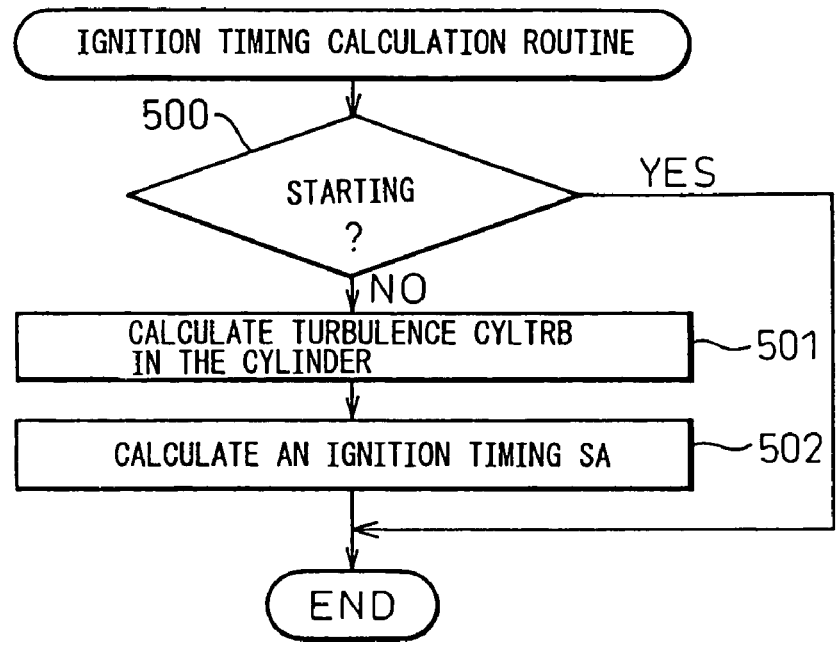
FIG. 49 is a flowchart illustrating a method of calculating the ignition timing according to a fifth embodiment.
Figure 50:
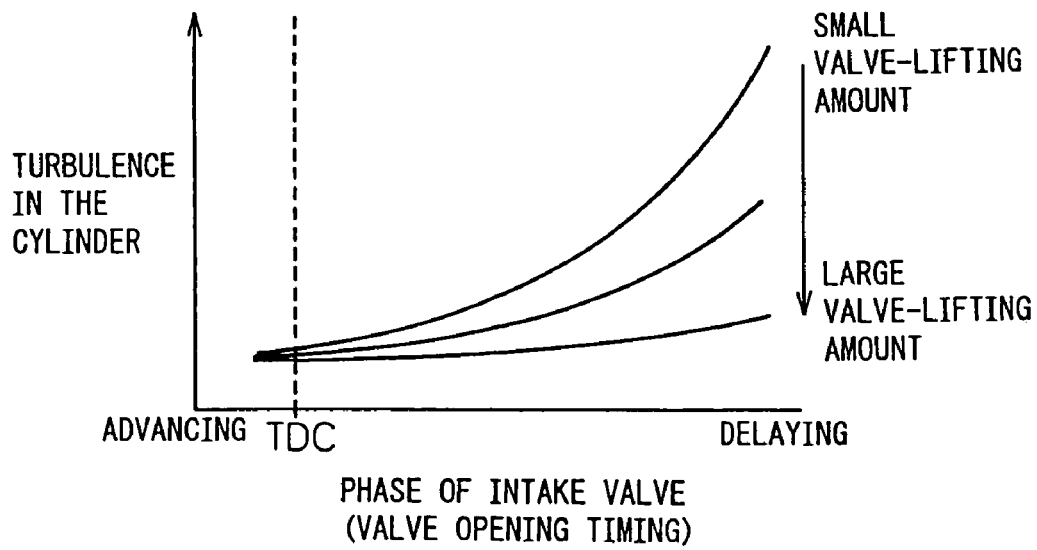
FIG. 50 is a diagram illustrating a relationship among the turbulence CYLTRB in the cylinder, the valve-lifting amount LT and the opening/closing timing (phase) VT.
Figure 51:
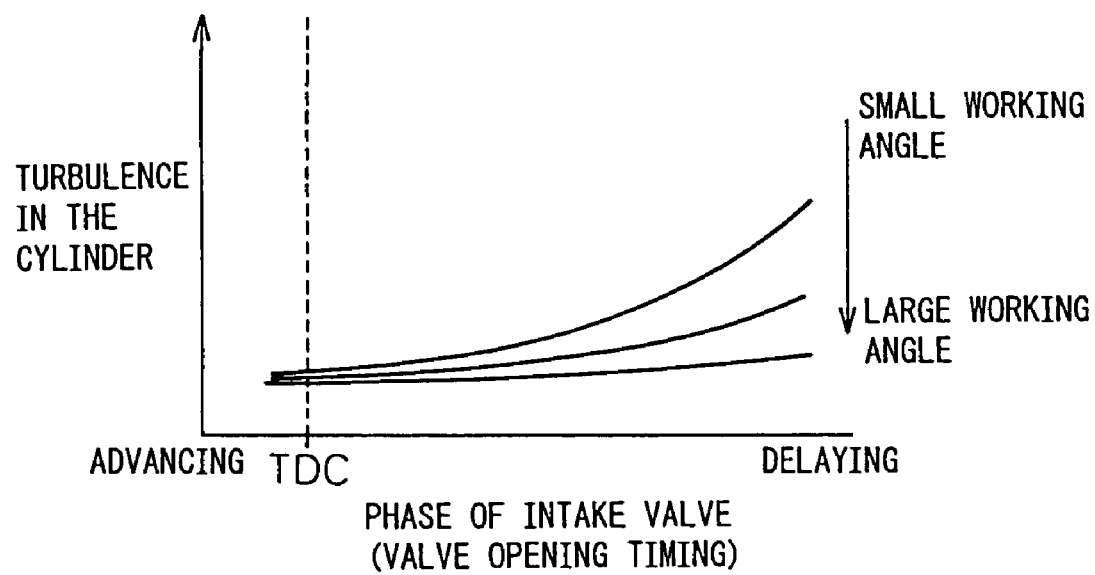
FIG. 51 is a diagram illustrating a relationship among the turbulence CYLTRB in the cylinder, the working angle VA and the opening/closing timing (phase) VT.

FIG. 49 is a flowchart illustrating a method of calculating the ignition timing according to the embodiment. This routine is executed at predetermined time intervals. When the routine starts as shown in FIG. 49, it is first judged at step 500 if the engine is being started. When the result is YES, the turbulence in the cylinder is correctly calculated at the start of the engine where the amount of the fuel is increased, it is so judged based thereupon that there is no need of determining the ignition timing, and the routine ends. When the result is NO, on the other hand, the routine proceeds to step 501. At step 501, the turbulence CYLTRB is calculated based on the valve-lifting amount LT of the intake valve 2, working angle VA, opening/closing timing VT, pressure PM in the intake pipe and engine rotational speed NE. FIG. 50 is a diagram illustrating a relationship among the turbulence CYLTRB in the cylinder, the valve-lifting amount LT and the opening/closing timing (phase) VT. As shown in FIG. 50, the turbulence CYLTRB in the cylinder calculated at step 501 increases with a decrease in the valve-lifting amount LT, or increases as the opening/closing timing (phase) VT delays. FIG. 51 is a diagram illustrating a relationship among the turbulence CYLTRB in the cylinder, the working angle VA and the opening/closing timing (phase) VT. As shown in FIG. 51, the turbulence CYLTRB in the cylinder calculated at step 501 increases with a decrease in the working angle VA.

Figure 52:
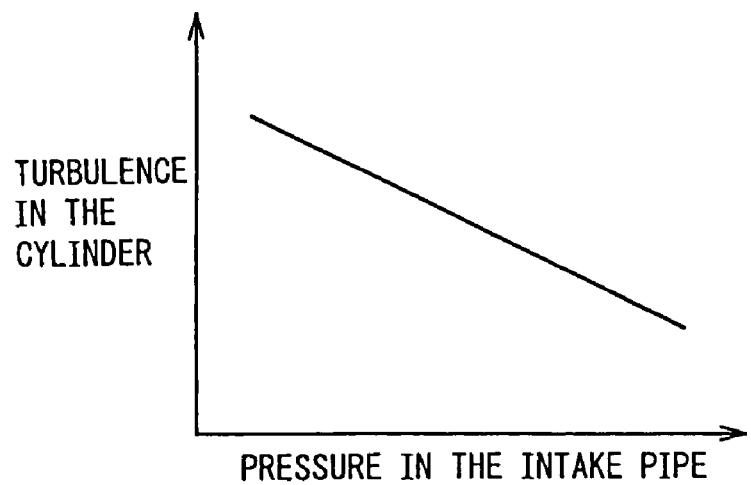
FIG. 52 is a diagram illustrating a relationship between the turbulence CYLTRB in the cylinder and the pressure PM in the intake pipe.
Figure 53:
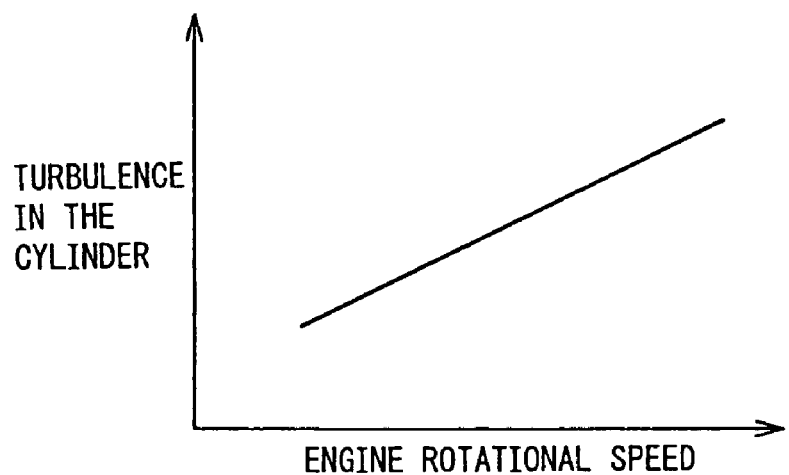
FIG. 53 is a diagram illustrating a relationship between the turbulence CYLTRB in the cylinder and the engine rotational speed NE.

FIG. 52 is a diagram illustrating a relationship between the turbulence CYLTRB in the cylinder and the pressure PM in the intake pipe. As shown in FIG. 52, the turbulence CYLTRB in the cylinder calculated at step 501 decreases with an increase in pressure PM in the intake pipe. FIG. 53 is a diagram illustrating a relationship between the turbulence CYLTRB in the cylinder and the engine rotational speed NE. As shown in FIG. 53, the turbulence CYLTRB in the cylinder calculated at step 501 increases with an increase in the engine rotational speed NE.

Figure 54:
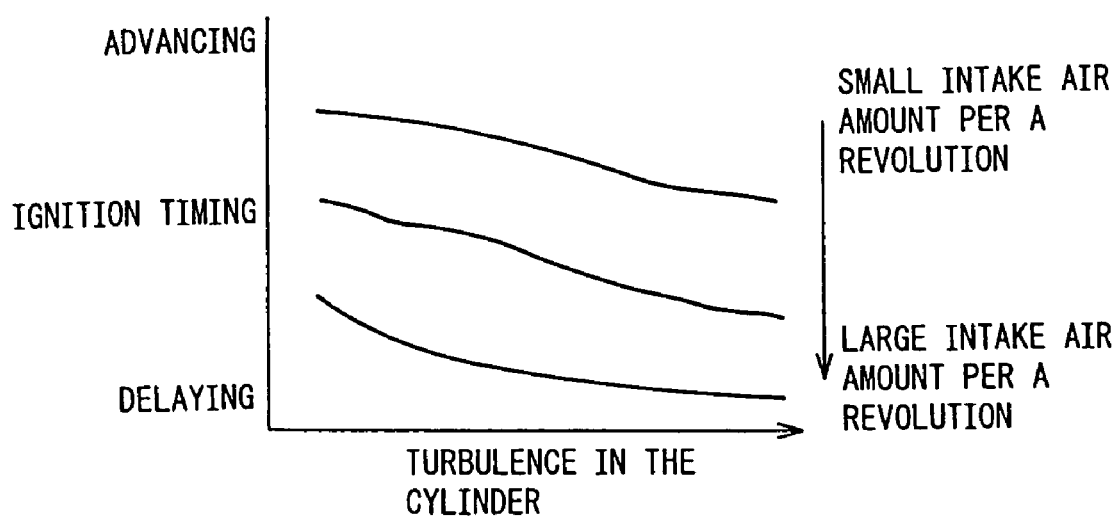
FIG. 54 is a diagram illustrating a relationship among the ignition timing SA, the turbulence CYLTRB in the cylinder and the air intake amount GN per a revolution.
Figure 55:
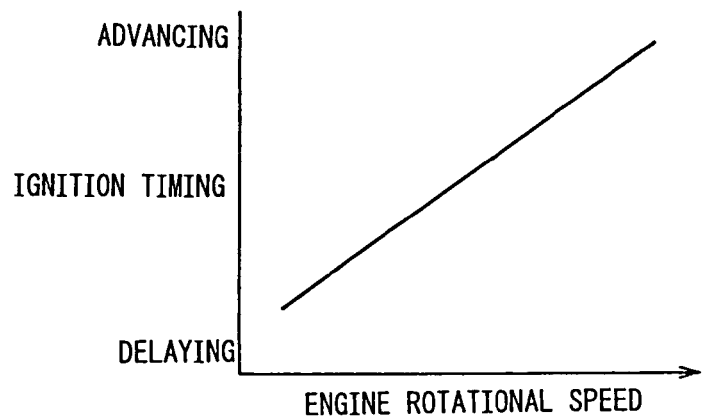
FIG. 55 is a diagram illustrating a relationship between the ignition timing SA and the engine rotational speed NE.

Reverting to the description of FIG. 49, an ignition timing SA is calculated based on the turbulence CYLTRB in the cylinder, intake air mount GN per a revolution and engine rotational speed NE. FIG. 54 is a diagram illustrating a relationship among the ignition timing SA, the turbulence CYLTRB in the cylinder and the intake air amount GN per one revolution. As shown in FIG. 54, the ignition timing SA calculated at step 502 is delayed with an increase in the turbulence CYLTRB in the cylinder, and is delayed with an increase in the intake air amount GN per a revolution. FIG. 55 is a diagram illustrating a relationship between the ignition timing SA and the engine rotational speed NE. As shown in FIG. 55, the ignition timing SA calculated at step 502 is advanced as the engine rotational speed NE increases.

In this embodiment as described above, the turbulence CYLTRB in the cylinder is calculated at step 501 of FIG. 49 based upon the opening area of the intake valve 2 that is varied depending upon the valve-lifting amount LT which is changed by the device 9 for changing the valve-lifting amount, which is the variable valve mechanism, and the internal combustion engine is controlled based on the turbulence CYLTRB in the cylinder. According to this embodiment, therefore, it is possible to suitably control the internal combustion engine by more correctly calculating the turbulence CYLTRB in the cylinder than when the turbulence CYLTRB in the cylinder is calculated without considering a change in the opening area of the intake valve 2 due to the variable valve mechanism, which is done by the device for controlling internal combustion engines taught in Japanese Unexamined Patent Publication (Kokai) No. 2000-73800. Namely, the internal combustion engine can be suitably controlled by correctly calculating the turbulence CYLTRB in the cylinder even when the opening area of the intake valve 2 is varied. More specifically, the turbulence CYLTRB in the cylinder calculated based on the opening area of the intake valve increases with an increase in the opening area of the intake valve 2 as shown in FIG. 50, and the internal combustion engine is so controlled that the ignition timing SA is delayed as the turbulence CYLTRB in the cylinder increases as shown in FIG. 54.

In this embodiment, further, the turbulence CYLTRB in the cylinder is calculated at step 501 of FIG. 49 based upon the working angle VA of the intake valve 2, opening/closing timing (phase) VT of the intake valve 2, pressure PM in the intake pipe and engine rotational speed NE, and the internal combustion engine is controlled based on the turbulence CYLTRB in the cylinder. According to this embodiment, therefore, it is possible to suitably control the internal combustion engine by more correctly calculating the turbulence CYLTRB in the cylinder than when the turbulence CYLTRB in the cylinder is not calculated based on the working angle VA of the intake valve 2, opening/closing timing (phase) VT of the intake valve 2, pressure PM in the intake pipe and engine rotational speed NE. In the embodiment and in the modified example thereof, the turbulence in the cylinder is calculated based on the opening area of the intake valve, and the internal combustion engine is controlled based on the turbulence in the cylinder. In another embodiment, it is possible to calculate the turbulence in the cylinder based on the opening areas of the discharge valves and to control the internal combustion engine based on the turbulence in the cylinder. Namely, the invention can be applied not only to the intake valves but also to the exhaust valves.

Described below is a sixth embodiment of the device for controlling an internal combustion engine according to the invention. The constitution of this embodiment is nearly the same as the constitution of the first embodiment illustrated in FIGS. 1 to 7 except the points that will be described later. Further, the control routine of this embodiment, which will be described later, is executed in combination with the control routine of any one of the embodiments described above. In the above embodiments, the cam has a nose of a height that is continuously changing as shown in FIG. 3. In this embodiment, instead, there are provided a high-speed cam H having a relatively high cam nose, a low-speed cam L having a relatively low cam noise and an intermediate-speed cam M having a cam nose of a height lying therebetween.

Figure 56:
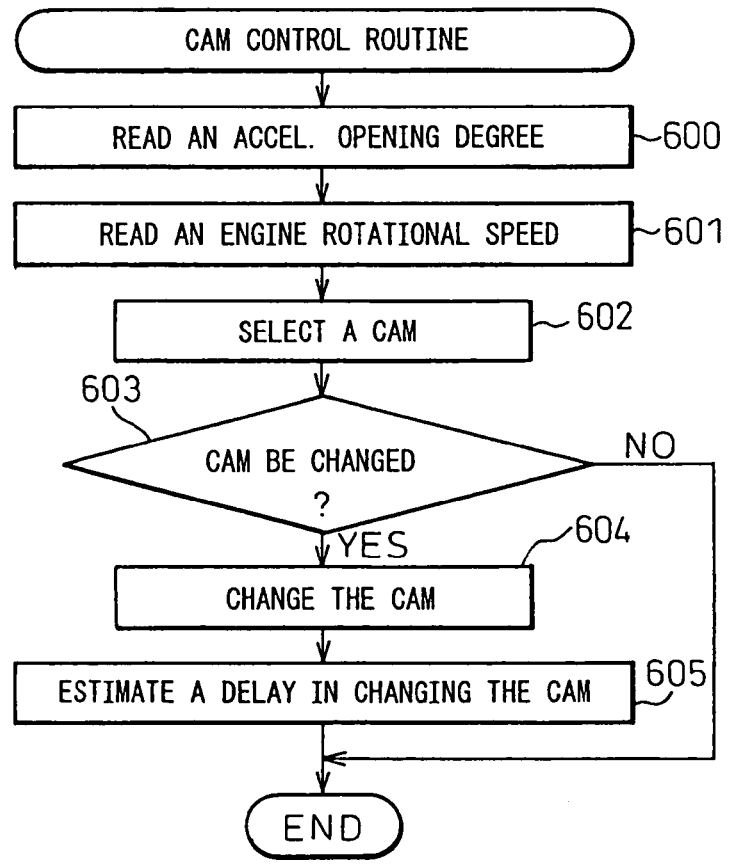
FIG. 56 is a flowchart illustrating a method of controlling the cam according to a sixth embodiment.
Figure 57:
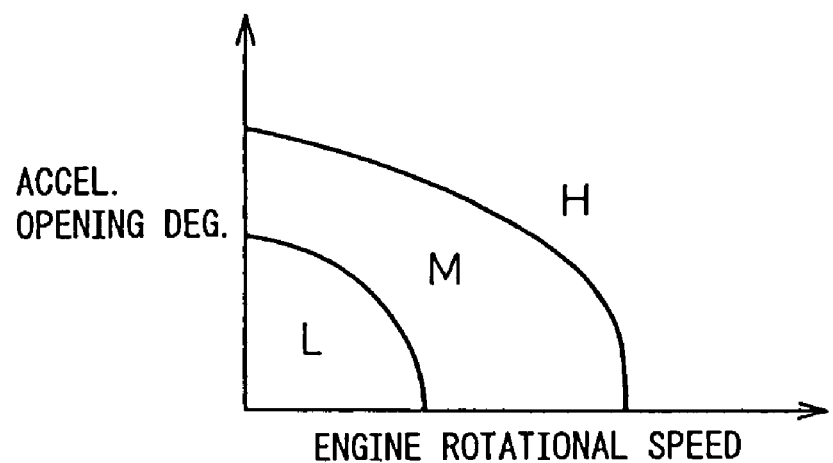
FIG. 57 is a diagram illustrating a relationship among the accelerator opening degree, the engine rotational speed and the cam to be selected.

FIG. 56 is a flowchart illustrating a method of controlling the cam according to the embodiment. This routine is executed at regular time intervals. When the routine starts as shown in FIG. 56, an accelerator opening degree calculated based on the output value of an accelerator opening sensor (not shown) is read at step 600. Then, at step 601, an engine rotational speed calculated based on the output value of the engine rotational speed sensor 17 is read. At step 602, a cam is selected based on the accelerator opening degree, engine rotational speed and relationship shown in FIG. 57. FIG. 57 is a diagram illustrating a relationship among the accelerator opening degree, the engine rotational speed and the cam to be selected. Referring to FIG. 57, when the accelerator opening degree is small and the engine rotational speed is low, the low-speed cam L is selected. The height of the cam nose to be selected increases with an increase in the accelerator opening degree, or the height of the cam nose to be selected increases with an increase in the engine rotational speed.

Figure 58:
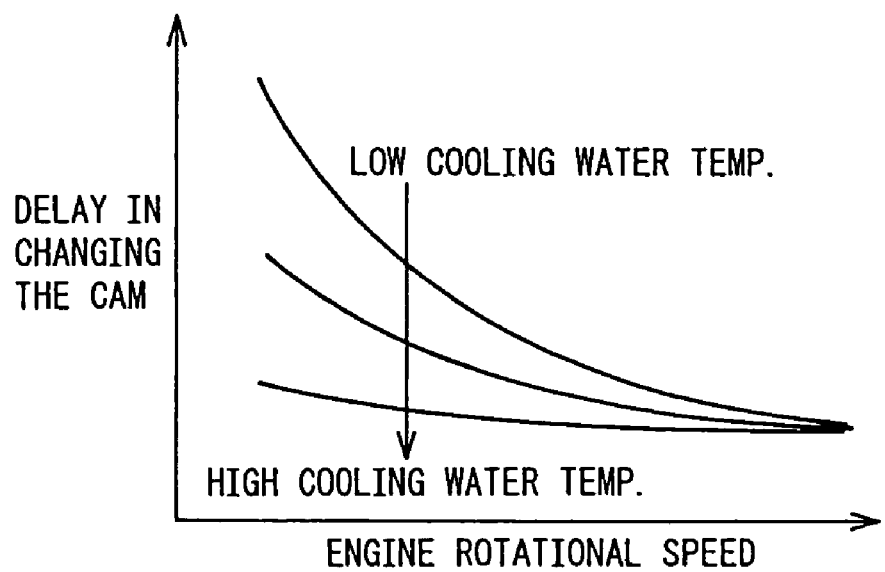
FIG. 58 is a diagram illustrating a relationship among the delay in changing the cam, the engine rotational speed and the cooling water temperature.

Then, at step 603, it is judged whether it is a timing for changing the cam. When the result is YES, the routine proceeds to step 604 and when the result is NO, the routine ends. At step 604, the cam is changed into the one that is selected. Then, at step 605, a delay in changing the cam is estimated based upon the engine rotational speed, upon the cooling water temperature calculated based on the output value of the cooling water temperature sensor 20 and upon a relationship illustrated in FIG. 58. FIG. 58 is a diagram illustrating the relationship among the delay in changing the cam, the engine rotational speed and the cooling water temperature. Referring to FIG. 58, the delay in changing the cam decreases with an increase in the engine rotational speed, and decreases with an increase in the cooling water temperature.

Figure 59:
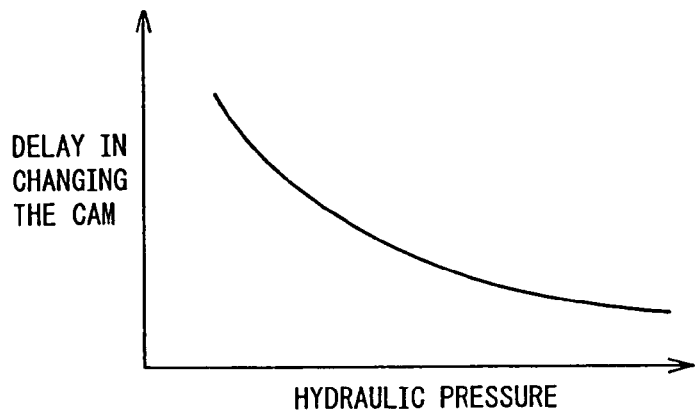
FIG. 59 is a diagram illustrating a relationship between the delay in changing the cam and the hydraulic pressure.

In a modified example of this embodiment, it is also possible to estimate a delay in changing the cam based on the pressure of the operation fluid for operating the cam instead of estimating the delay in changing the cam based on the temperature of the cooling water. FIG. 59 is a diagram illustrating a relationship between the delay in changing the cam and the hydraulic pressure. As shown in FIG. 59, it is estimated that the delay in changing the cam decreases with an increase in the hydraulic pressure.

Figure 60:
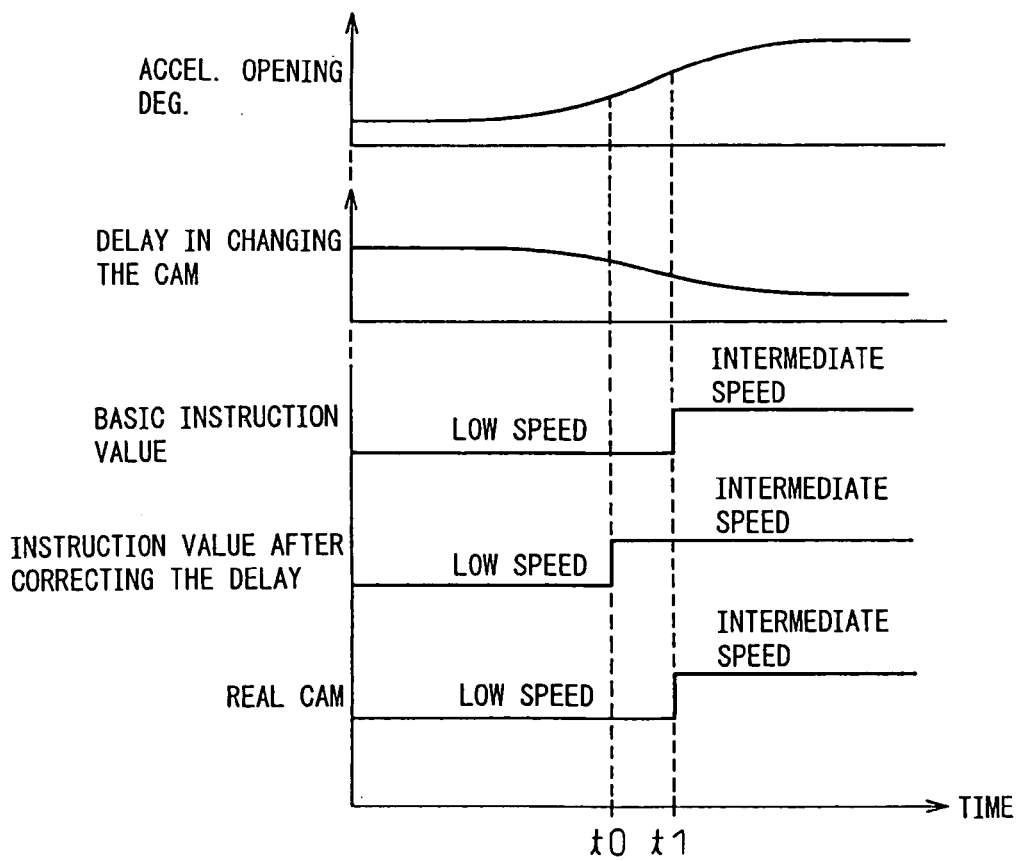
FIG. 60 is a diagram illustrating a relationship between the timing for producing an instruction for changing the cam and the timing at which the cam really changes.

In another embodiment of this embodiment, the delay in changing the cam is estimated in advance prior to changing the cam based on the operating condition or the hydraulic pressure, and the timing for changing the cam is determined by taking the delay into consideration. FIG. 60 is a diagram illustrating a relationship between a moment when an instruction is issued to change the cam and the moment at which the cam is actually changed. Referring to FIG. 60, a delay in changing the cam (=time t1−time t0) is estimated and when it is attempted to change the cam at the time t1, an instruction to change the cam is issued at the time t0.

Figure 61:
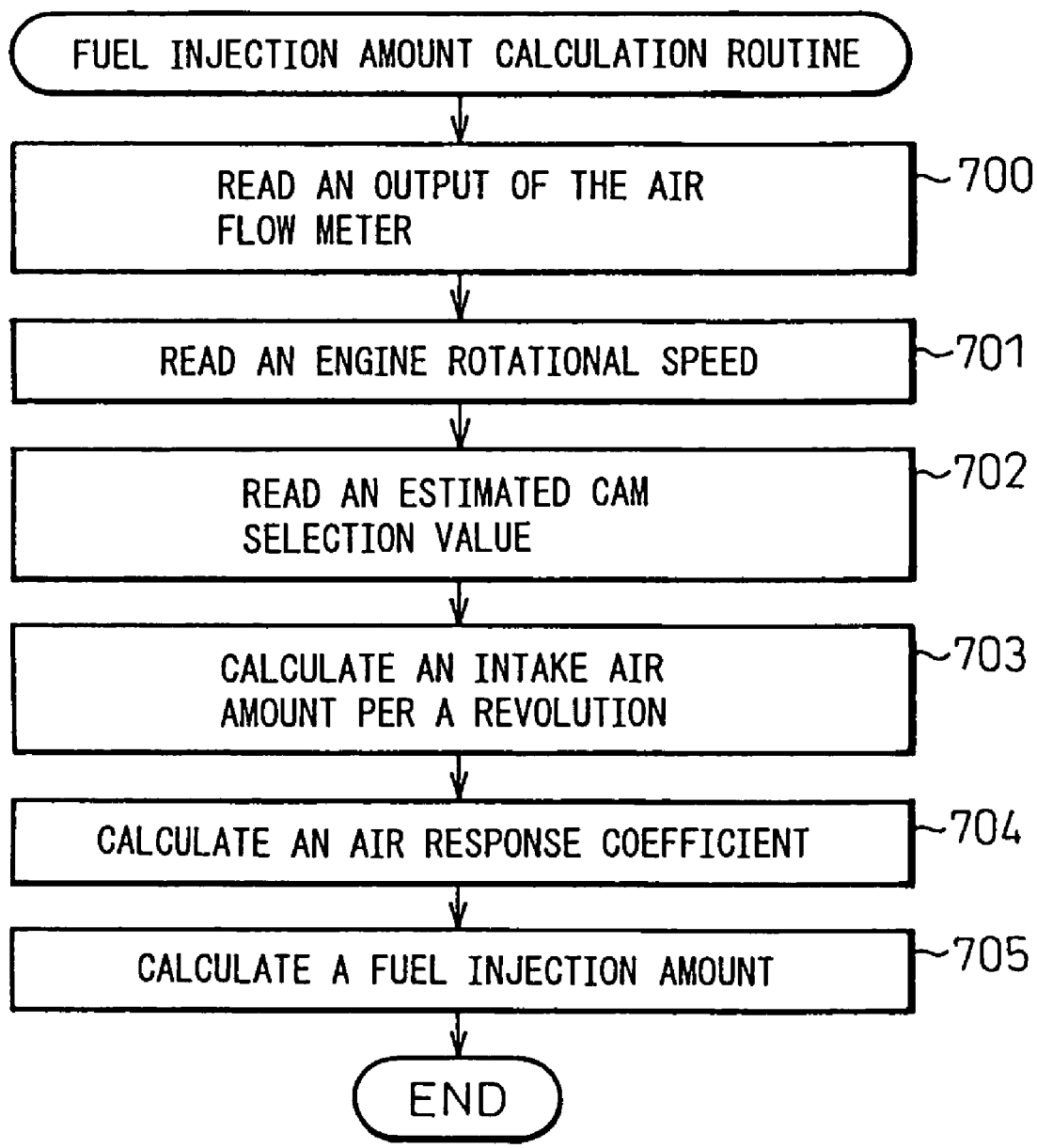
FIG. 61 is a flowchart illustrating a method of calculating the amount of fuel injection according to a sixth embodiment.
Figure 62:
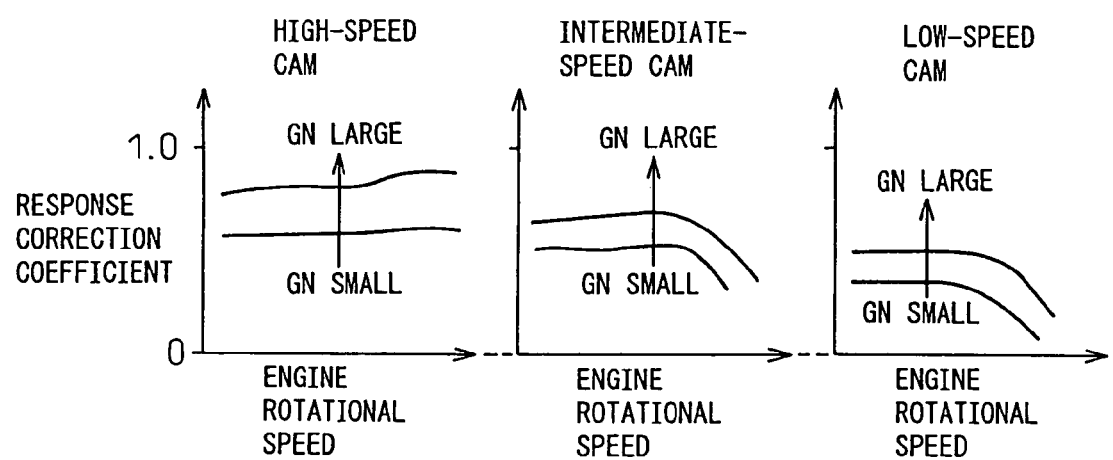
FIG. 62 is a diagram illustrating a relationship among the response correction coefficient, the type of cam, the engine rotational speed and the intake air amount GN per one revolution.
Figure 63:
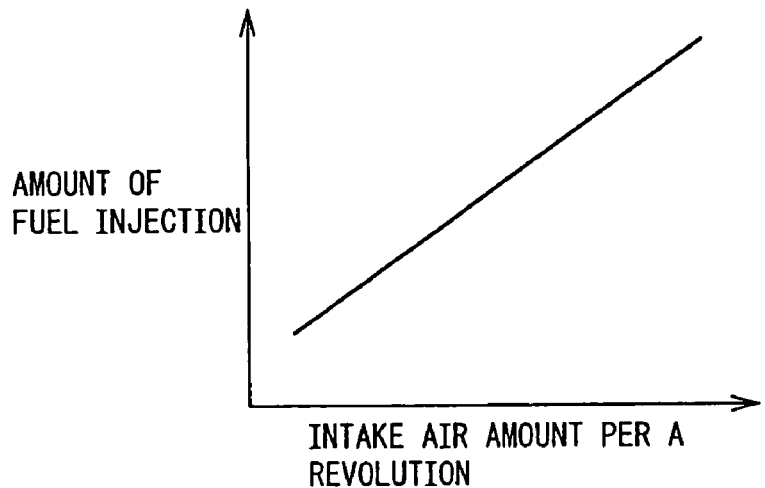
FIG. 63 is a diagram illustrating a relationship between the amount of fuel injection and the intake air amount per one revolution.

FIG. 61 is a flowchart illustrating a method of calculating a fuel injection amount according to the embodiment. This routine is executed at regular time intervals. When the routine starts as shown in FIG. 61, first, an output value of the air flow meter 19 is read at step 700. Then, at step 701, an engine rotational speed calculated based on the output value of the engine rotational speed sensor 17 is read. Then, an estimated cam selection value is read at step 702. That is, a flag representing a cam selected at step 602 of FIG. 56 is read. Then, at step 703, an intake air amount per a revolution is calculated by the same method as the one of the above-mentioned embodiment. At step 704, a response correction coefficient is calculated based on the type of the cam, the engine rotational speed, the intake air amount per a revolution and a relationship shown in FIG. 62. FIG. 62 is one diagram illustrating the relationship among the response correction coefficient, type of the cam, engine rotational speed and intake air amount GN per one revolution. Then, at step 705, a fuel injection amount is calculated based on the intake air amount per a revolution and a relationship shown in FIG. 63. FIG. 63 is a diagram illustrating the relationship between the fuel injection amount and the intake air amount per a revolution.

Figure 64:
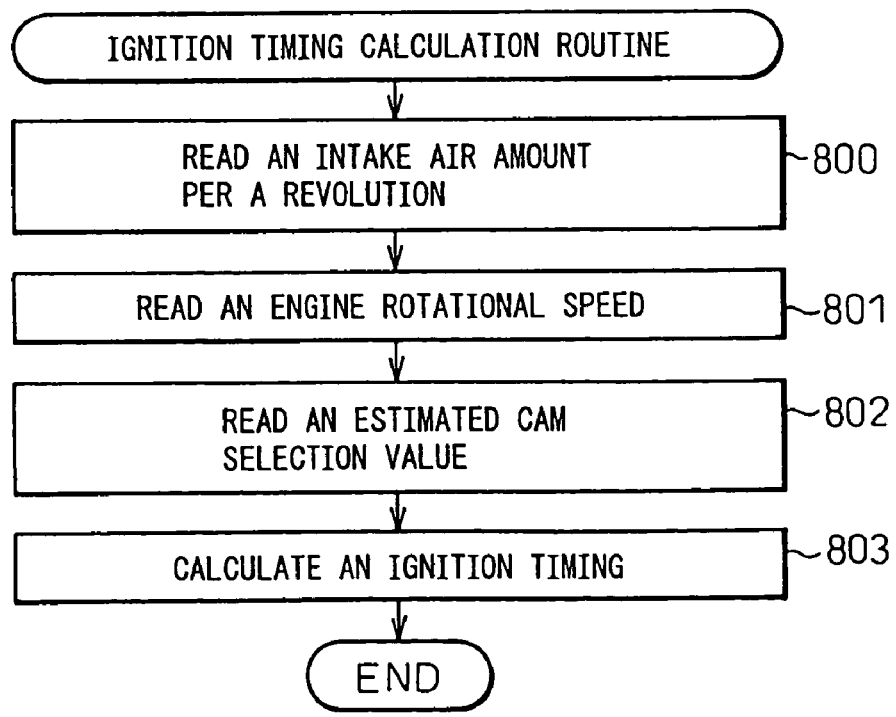
FIG. 64 is a flowchart illustrating a routine for calculating the ignition timing according to the sixth embodiment.
Figure 65:
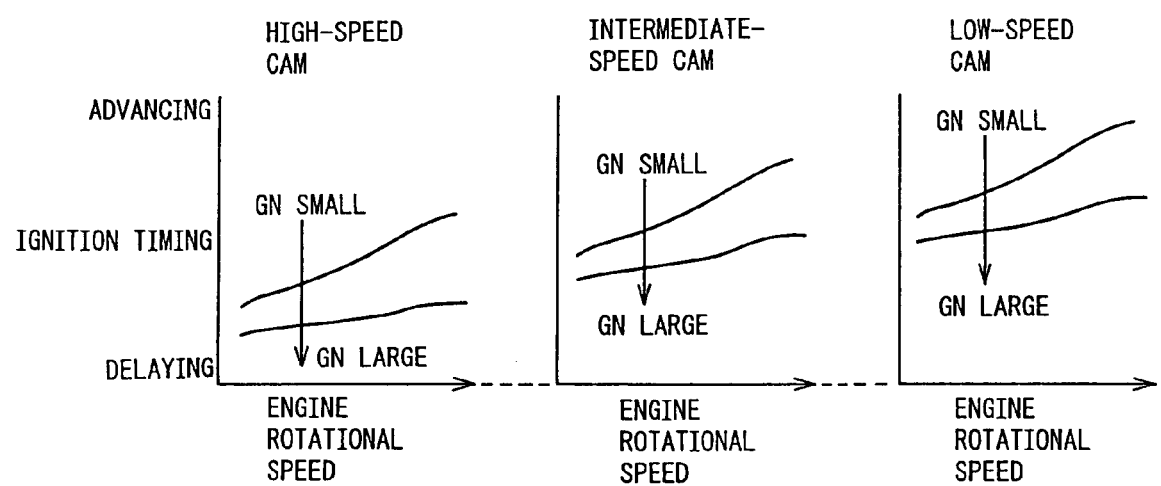
FIG. 65 is a diagram illustrating a relationship among the ignition timing, the type of cam, the engine rotational speed and the intake air amount GN per one revolution.

FIG. 64 is a flowchart illustrating a routine for calculating an ignition timing according to the embodiment. This routine is executed at regular time intervals. When the routine starts as shown in FIG. 64, first, an intake air amount per one revolution is read at step 800. Then, at step 801, the engine rotational speed is read. Next, an estimated cam selection value is read at step 802. Thereafter, at step 803, an ignition timing is calculated based on the type of the cam, the engine rotational speed, the intake air amount per one revolution and a relationship shown in FIG. 65. FIG. 65 is a diagram illustrating the relationship among the ignition timing, type of the cam, engine rotational speed and intake air amount GN per one revolution.

In a modified example of the above embodiment, it is also possible, as required, to employ the intake and exhaust valves driven by the electromagnetic force or the hydraulic pressure instead of using the intake and exhaust valves driven by the cams.

According to the present invention as described above, the internal combustion engine can be controlled based not only upon the peak combustion pressure in the cylinder but also upon a pressure in the cylinder at a moment other than the peak combustion pressure. Namely, the internal combustion engine can be suitably controlled even when the opening areas or the working angles of the intake and exhaust valves are varied.

Further, the invention not only controls the internal combustion engine based simply on the cylinder wall temperature but also controls the internal combustion engine based on a correctly measured temperature of gas in the cylinder. The invention, further, makes it possible to suitably control the internal combustion engine even when the opening areas or the working angles of the intake and exhaust valves are varied.

According to the invention, further, the amount of the internal EGR gas is correctly calculated even when the opening areas or the working angles of the intake and exhaust valves are varied, and the internal combustion engine is suitably controlled based on the calculated amount of the internal EGR gas.

Lastly, according to the invention, the degree of turbulence in the cylinder is correctly estimated even when the opening areas of the intake vales are varied by the variable valve mechanism, and the internal combustion engine is suitably controlled based on the degree of turbulence in the cylinder.

The invention claimed is:

1. A device for controlling an internal combustion engine based on a temperature of a certain portion in a cylinder, comprising a variable valve mechanism for varying opening areas of at least either an intake valve or an exhaust valve, wherein a temperature of gas in the cylinder is calculated based on the opening area of at least either the intake valve or the exhaust valve varied by the variable valve mechanism, and the internal combustion engine is controlled based on the temperature of gas in the cylinder.

2. A device for controlling an internal combustion engine according to claim 1, wherein the temperature of gas in the cylinder is calculated based on the opening area of the intake valve, the calculated temperature of gas in the cylinder increasing with an increase in the opening area of the intake valve.

3. A device for controlling an internal combustion engine according to claim 1, wherein an ignition timing of the internal combustion engine is controlled based on the calculated temperature of gas in the cylinder, the ignition timing delaying with an increase in the calculated temperature of gas in the cylinder.

4. A device for controlling an internal combustion engine according to claim 1, wherein the temperature of gas in the cylinder is corrected based on at least any one of a cylinder wall temperature, engine rotational speed, intake air amount, amount of an internal EGR gas or temperature of the internal EGR gas.

5. A device for controlling an internal combustion engine based on a temperature of a certain portion in a cylinder, comprising a variable valve mechanism for varying working angles of at least either an intake valve or an exhaust valve, wherein a temperature of gas in the cylinder is calculated based on the working angle of at least either the intake valve or the exhaust valve varied by the variable valve mechanism, and the internal combustion engine is controlled based on the temperature of gas in the cylinder.

6. A device for controlling an internal combustion engine according to claim 5, wherein the temperature of gas in the cylinder is calculated based on the working angle of the intake valve, the calculated temperature of gas in the cylinder increasing with a decrease in the working angle of the intake valve when the intake valve is closed before an intake bottom dead center of the cylinder, and increasing with an increase in the working angle of the intake valve when the intake valve is closed after the intake bottom dead center of the cylinder.

7. A device for controlling an internal combustion engine, comprising a variable valve mechanism for varying opening areas and working angles of at least either an intake valve or an exhaust valve, wherein a temperature of gas in a cylinder is calculated based on the opening area and the working angle of at least either the intake valve or the exhaust valve varied by the variable valve mechanism, and the internal combustion engine is controlled based on the temperature of gas in the cylinder.

8. A device for controlling an internal combustion engine according to claim 7, wherein the temperature of gas in the cylinder is calculated based on a phase of the intake valve, pressure in an intake pipe and engine rotational speed in addition to said opening area and said working angle, and the internal combustion engine is controlled based on the temperature of gas in the cylinder.

9. A device for controlling an internal combustion engine according to claim 7, wherein the temperature of gas in the cylinder is calculated based on the opening area and the working angle of the intake valve, the calculated temperature of gas in the cylinder increasing with an increase in the opening area of the intake valve, increasing with a decrease in the working angle of the intake valve when the intake valve is closed before an intake bottom dead center of the cylinder, and increasing with an increase in the working angle of the intake valve when the intake valve is closed after the intake bottom dead center of the cylinder.

* * * * *